US010771996B2

(12) United States Patent
Futaki et al.

(10) Patent No.: US 10,771,996 B2
(45) Date of Patent: *Sep. 8, 2020

(54) RADIO COMMUNICATION SYSTEM, RADIO TERMINAL, RADIO NETWORK, RADIO COMMUNICATION METHOD AND PROGRAM

(71) Applicant: NEC CORPORATION, Tokyo (JP)

(72) Inventors: Hisashi Futaki, Tokyo (JP); Hiroaki Aminaka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,055

(22) Filed: Jun. 7, 2019

(65) Prior Publication Data

US 2019/0297515 A1 Sep. 26, 2019

Related U.S. Application Data

(60) Continuation of application No. 15/996,761, filed on Jun. 4, 2018, now Pat. No. 10,356,639, which is a
(Continued)

(30) Foreign Application Priority Data

Jan. 7, 2010 (JP) ................................ 2010-002365

(51) Int. Cl.
*H04W 24/00* (2009.01)
*H04W 24/08* (2009.01)
(Continued)

(52) U.S. Cl.
CPC ............ *H04W 24/08* (2013.01); *H04L 43/06* (2013.01); *H04W 24/10* (2013.01); *H04W 76/27* (2018.02);
(Continued)

(58) Field of Classification Search
CPC ..... H04W 24/08; H04W 24/10; H04W 76/27; H04W 8/24; H04W 84/042; H04W 88/02; H04L 43/06; H05K 999/99
See application file for complete search history.

(56) References Cited

U.S. PATENT DOCUMENTS 7,738,864 B2 6/2010 Donovan et al.
9,973,954 B2 * 5/2018 Johansson ............. H04W 24/10
(Continued)

FOREIGN PATENT DOCUMENTS

CN 1756202 A 4/2006
CN 101253792 A 8/2008
(Continued)

OTHER PUBLICATIONS

Qualcomm Europe, UE measurements for Minimiazing Drive tests, 3GPP TSG-RAN WG2 meeting #65bis R2-092029, Mar. 23, 2009.
(Continued)

*Primary Examiner* — Khai M Nguyen
(74) *Attorney, Agent, or Firm* — Sughrue Mion, PLLC

(57) ABSTRACT

A radio terminal, which has a function to collect and report measurement information designated by a radio network, comprises: means for receiving collection/reporting control information related to the radio terminal's execution of at least one of the collection of measurement information and the reporting of the measurement information to the radio network; and control means for executing, based on the collection/reporting control information, at least one of the collection and the reporting if execution determination information, which is related to at least one of the collection of the measurement information and the reporting of the measurement information to be executed by the local terminal, satisfies a given determination criterion.

10 Claims, 22 Drawing Sheets

Related U.S. Application Data continuation of application No. 15/157,893, filed on May 18, 2016, now Pat. No. 10,034,187, which is a continuation of application No. 14/284,596, filed on May 22, 2014, now Pat. No. 9,894,544, which is a division of application No. 13/520,596, filed as application No. PCT/JP2011/050047 on Jan. 5, 2011, now Pat. No. 9,693,243.

(51) Int. Cl.
| | |
|---|---|
| H04W 24/10 | (2009.01) |
| H04W 76/27 | (2018.01) |
| H04L 12/26 | (2006.01) |
| H04W 8/24 | (2009.01) |
| H04W 88/02 | (2009.01) |
| H04W 84/04 | (2009.01) |

(52) U.S. Cl.
CPC ............ *H05K 999/99* (2013.01); *H04W 8/24* (2013.01); *H04W 84/042* (2013.01); *H04W 88/02* (2013.01)

(56) References Cited

U.S. PATENT DOCUMENTS

| | | | |
|---|---|---|---|
| 10,034,187 | B2 | 7/2018 | Futaki et al. |
| 10,356,639 | B2* | 7/2019 | Futaki ............... H04W 24/10 |
| 2006/0039329 | A1 | 2/2006 | Samuel et al. |
| 2006/0075307 | A1 | 4/2006 | Sano |
| 2006/0166693 | A1 | 7/2006 | Jeong et al. |
| 2006/0217152 | A1 | 9/2006 | Fok et al. |
| 2007/0180089 | A1 | 8/2007 | Fok et al. |
| 2009/0011779 | A1 | 1/2009 | MacNaughtan et al. |
| 2009/0022062 | A1 | 1/2009 | Wang et al. |
| 2009/0036098 | A1 | 2/2009 | Lee et al. |
| 2009/0168694 | A1 | 7/2009 | Akselin et al. |
| 2010/0041412 | A1 | 2/2010 | Yu |
| 2010/0240397 | A1 | 9/2010 | Buchmayer et al. |
| 2012/0046066 | A1 | 2/2012 | Tamura et al. |
| 2012/0120810 | A1* | 5/2012 | Wang ............... H04W 24/10 370/242 |
| 2012/0142356 | A1 | 6/2012 | Serravalle et al. |
| 2012/0282916 | A1* | 11/2012 | Futaki ............... H05K 999/99 455/422.1 |
| 2013/0109320 | A1* | 5/2013 | Tomala ............... H04W 24/10 455/67.11 |
| 2013/0183978 | A1 | 7/2013 | Keskitalo et al. |
| 2013/0265903 | A1 | 10/2013 | Kim et al. |
| 2014/0051428 | A1 | 2/2014 | Jung et al. |
| 2014/0052871 | A1 | 2/2014 | Andrianov et al. |

FOREIGN PATENT DOCUMENTS

| | | |
|---|---|---|
| CN | 101299860 A | 11/2008 |
| CN | 101330702 A | 12/2008 |
| EP | 2117238 A1 | 11/2009 |
| EP | 2 200 352 A1 | 6/2010 |
| EP | 2200352 A1 | 6/2010 |
| JP | H11-284561 A | 10/1999 |
| JP | 2006-085534 A | 3/2006 |
| JP | 2008-512047 A | 4/2008 |
| JP | 2008-537667 A | 9/2008 |
| JP | 2008-306240 A | 12/2008 |
| JP | 2009-165157 A | 7/2009 |
| JP | 2009-525703 A | 7/2009 |
| JP | 2009-177576 A | 8/2009 |
| JP | 2009-278450 A | 11/2009 |
| JP | 2009278450 A | 11/2009 |
| JP | 2010-512101 A | 4/2010 |
| JP | 2010512101 A | 4/2010 |
| WO | 2007/005030 A2 | 1/2007 |
| WO | 2008/087535 A2 | 7/2008 |
| WO | 2008/088168 A1 | 7/2008 |
| WO | 2008088168 A1 | 7/2008 |
| WO | 2009/011064 A1 | 1/2009 |
| WO | 2009/041498 A1 | 4/2009 |
| WO | 2009/048088 A1 | 4/2009 |
| WO | 2009/067509 A2 | 5/2009 |
| WO | 2009/117443 A1 | 9/2009 |

OTHER PUBLICATIONS

3GPP TR 36.805 V1.2.0 "3rd Generation Partnership Project; Technical Specification Group Radio Access Network; Study on Minimization of Drive-Tests in Next Generation Networks; (Release 9)", Aug. 2009, (internet<http://www.3gpp.org/ftp/Specs/html-info/36805.htm>).

3GPP TR 36.805 V9.0.0 "Study on Minimization of drive-tests in Next Generation Networks;" (Release 9) Dec. 2009, pp. 1-24 <http://www.3gpp.org/ftp/Specs/archive/36_series/36.805/36805-900.zip>.

3GPP TR 36.805 V9.0.0, Technical Report, 3rd Generation Partnership Project; Technical Specification Group Radio Access Network; Study on Minimization of Drive-tests in Next Generation Networks (Release 9), Dec. 2009.

3GPP TSG-RAN WG2 meeting #67, "Email Discussion Summary [66b#7] LTW-UMTS: Minimisation of Drive Tests", R2-094291, Qualcomm Europe, Aug. 24-28, 2009, Shenzhen, China.

3GPP TSG-RAN WG2 meeting #67, R2-094291 "Email Discussion Summary 66b#7 R2-094291, LTE-UMTS: Minimization of Drive Tests", Qualcomm Europe, Aug. 24-28, 2009, (internet< http://www.3gpp.org/ftp/tsg_ran/WG2_RL2/TSGR2_67/Docs/R2-094191.zip>), Shenzhen, China.

Abstract; Cited in Communication dated Nov. 12, 2014 from Patent Office in counterpart application No. 2011-549007.

An Office Action dated Sep. 14, 2017, which issued during the prosecution of U.S. Appl. No. 15/157,893.

Communication dated Oct. 25, 2017 from the United States Patent and Trademark Office in counterpart US application No. 142842596.

Communication dated Apr. 1, 2016, from the State Intellectual Property Office of People's Republic of China in counterpart Application No. 201180004596.7.

Communication dated Apr. 1, 2016, from the State Intellectual Property Office of People's Republic of China in counterpart Application No. 201180004597.1.

Communication dated Feb. 20, 2013 from the Japanese Patent Office in counterpart application No. 2013-008036.

Communication dated Feb. 8, 2016 from the Japan Patent Office in counterpart Japanese Application No. 2016-051008.

Communication dated Feb. 8, 2017, from the Japanese Patent Office in counterpart application No. 2016-051008.

Communication dated Jul. 18, 2014 from the United States Patent Office in counterpart U.S. Appl. No. 13/520,596.

Communication dated Jul. 23, 2015, issued by the U.S. Patent and Trademark Office in corresponding U.S. Appl. No. 14/284,596.

Communication dated Jun. 16, 2014 from the State Intellectual Property Office of the People's Republic of China in counterpart Chinese Patent Application No. 201180004597.1.

Communication dated Jun. 24, 2015 from the Japanese Patent Office in counterpart application No. 2011-549007.

Communication dated Jun. 24, 2015, issued by the Japanese Patent Office in counterpart Application No. 2011549007.

Communication dated Mar. 4, 2016 from the European Patent Office issued in corresponding Application No. 11731798.2.

Communication dated Mar. 4, 2016 from the Korean Intellectual Property Office issued in corresponding Application No. 10-2014-7000175.

Communication dated Mar. 5, 2015, issued by the United States Patent and Trademark Office in counterpart U.S. Appl. No. 13/520,596.

Communication dated Nov. 12, 2014 from the Japanese Patent Office in counterpart application No. 2011-549007.

Communication dated Oct. 25, 2017 from the United States Patent and Trademark Office in counterpart U.S. Appl. No. 14/284,596.

Communication dated Oct. 29, 2018, from the European Patent Office in counterpart European Application No. 11731798.2.

(56) References Cited

OTHER PUBLICATIONS

ZTE, "Hybrid Architecture for MDT", Discussion and Approval, 3GPP TSG RAN WG2 #68, R2-096772 pp. 1-4 Nov. 9-13, 2009.
Y-J Kang et al "The effect of Al(OH)3 coating on the LiJUo^NiojMno.eKh cathode material for lithium secondary battery" Awww.5ciencedirect.com; Oct. 19, 2004; pp. 1-8.
Wikipedia: PLMN Korean article, 2014, 4 pages, https://ko.wikipedia.org/wiki/PLMN.
Samsung, "Applicability of equivalent PLMNs to Minimized Driving Test (MDT)", SA WG2 Meeting #87, Oct. 10-14, 2011, Jeju Island, South Korea, TD S2-114092, p. 1-5.
Qualcomm Europe, UE measurements for Minimizing Drive Tests, 3Gpp TSG-RAN WG2 meeting #65bis R2-092029, Mar. 23, 2009.
Qualcomm Europe, "Consideration on reporting policy for MDT", 3GPP TSG-RAN WG2 meeting #66bis, Jun. 29-Jul. 3, 2009, R2-093709, 3 pages total.
Qualcomm Europe, "Consideration on reporting policy for MDT", 3GPP Draft, R2-093709, 3rd Generation Partnership Project (3GPP), Jun. 23, 2009.
Office Action, dated May 7, 2014, issued by the Korean Intellectual Property Office, in counterpart Application No. 10-2012-7017706.
Office Action, dated May 14, 2014, issued by the Japanese Patent Office, in counterpart Application No. 2013-168805.
Office Action issued Sep. 14, 2015 in counterpart Chinese Patent Application No. 201180004597.1.
Office Action dated Feb. 20, 2013 in counterpart Japanese Patent Application No. 2013-008036 with English concise statement.
Counterpart KR Notice of Closing of Trial dated Jan. 16, 2019 in corresponding KR application No. 2014-7000175.
Do., M., "LTE: Tracking Area (TA) and Tracking Area Update (TAU)", NETMANIAS: Analyze Trends, Technologies and Market, 2013, 2 pages, http://www.netmanias.com/en/post/blog/5930/lte-tau/lte-tracking-area-ta-and-tracking-area-update-tau.
International Search Report of PCT/JP2011/050047 dated Feb. 8, 2011.
Motorola, "Enhanced selection of UEs for collection and reporting of measurements", 3GPP TSG-SA5 Meeting #68, Nov. 9-13, Shanghai, China S5-094283, 6 pages.
Motorola, "Measurements supporting minimization of drive test use cases", 3GPP TSG-RAN2 Meeting #66, Tdoc R2-093208, May 4-8, 2009, 7 pages total.
Nokia Corp., Nokia Siemens Networks, "Location information for minimization of test drive test", Discussion and decision, 3GPP TSG-RAN WG2 Meeting #67bis, R2-095639, 3 pages total, Oct. 12-16, 2009.
Office Action dated Feb. 20, 2013 issued by the Japanese Patent Office in counterpart Japanese Patent Application No. 2012-199043.
Office Action dated Nov. 21, 2012 issued by the Japanese Patent Office in counterpart Japanese Patent Application No. 2012-199043.
Office Action issued by the Japanese Patent Office dated Jun. 26, 2013 in corresponding Application No. 2013-008036.
Qualcomm Europe, "MDT architecture comparison", Discussion and decision, 3GPP TSG-RAN WG2 meeting #68, R2-096719, 5 pgs total, Nov. 9-13, 2009.
Communication from the United States Patent and Trademark Office dated Jul. 12, 2016, in U.S. Appl. No. 13/520,596.
Communication dated Oct. 4, 2017 from the Japanese Patent Office in counterpart application No. 2016-051008.
Communication dated Jul. 10, 2019 from the Japanese Patent Office in counterpart application No. 2018-090293.

* cited by examiner

FIG. 7

| ITEM (CATEGORY) | ITEM (INDEX) | REFERENCE VALUE (EXAMPLE) |
|---|---|---|
| COMMUNICATION QUALITY | RSRP | x1 dBm |
| | RSRQ | x2 dBm |
| REMAINING BATTERY CHARGE | REMAINING QUANTITY | xx W |
| | REMAINING MEMORY CAPACITY | x PIECES |
| LOCATION | TA | TA ID ## |
| | PLMN | PLMN ID ## |
| | GPS | CENTER OF CIRCLE + RADIUS |
| | GPS | TWO POINTS ON DIAGONAL LINE OF SQUARE |
| | GPS | VALUE OBTAINED BY OMITTING RESPECTIVE THREE DIGITS (AFTER SECOND) OF LONGITUDE AND LATITUDE OF LOCATION INFORMATION AT CERTAIN POINT |
| MOVING SPEED | MOVING SPEED LEVEL (high, medium, low) | Low |
| ..... | ..... | ..... |

FIG. 8

| ITEM (CATEGORY) | ITEM (INDEX) | REFERENCE VALUE (EXAMPLE) |
|---|---|---|
| SORT OF LOG | PERIODICAL QUALITY MEASUREMENT OF DOWNLINK PILOT SIGNALS (Periodical downlink pilot measurements) | - |
| | BROADCAST CHANNEL RECEPTION ERROR (Broadcast Channel Failure) | - |
| | PAGING CHANNEL RECEPTION ERROR (Paging Channel Failure) | - |
| | RECEIVED QUALITY OF SERVING CELL BECOMING WORSEN THAN THRESHOLD (Serving Cell becomes worse than threshold) | - |
| | EXTRA TRANSMIT POWER BEING LESS THAN PREDETERMINED THRESHOLD (Transmit power headroom becomes less than threshold) | - |
| | FAILURE OF RANDOM ACCESS (Random access failure) | - |
| | RADIO LINK CUTTING (Radio link failure) | - |
| AMOUNT OF LOGS | MEMORY USAGE AMOUNT OF TERMINAL | xx kB |
| ACQUISITION LOCATION OF LOG | Cell (CGI/PCI) | Cell ID## |
| | TA | TA ID## |
| | GPS | xyz |
| ACQUISITION TIME OF LOG | TIME (ABSOLUTE TIME/QUANTIZATION TIME/RELATIVE TIME) | hh.mm.ss |

FIG. 13

| ID No. | ITEM (CATEGORY) | ITEM (INDEX) | REFERENCE VALUE (EXAMPLE) |
|---|---|---|---|
| 1 | COMMUNICATION QUALITY | RSRP | x1 dBm |
| 2 | | | y1 dBm |
| 3 | | RSRQ | x2 dBm |
| 4 | | | y2 dBm |
| 5 | REMAINING BATTERY CHARGE | REMAINING QUANTITY | xx W |
| 6 | | | yy W |
| 7 | | REMAINING MEMORY CAPACITY | x PIECES |
| 8 | | | y PIECES |
| 9 | MOVING SPEED | MOVING SPEED LEVEL | Low |
| 10 | ..... | ..... | ..... |

FIG. 14

| ID No. | ITEM (CATEGORY) | ITEM (INDEX) | REFERENCE VALUE (EXAMPLE) |
|---|---|---|---|
| 1 | COMMUNICATION QUALITY | RSRP | x1 dBm |
| 2 | | RSRQ | y1 dBm |
| 3 | REMAINING BATTERY CHARGE | REMAINING QUANTITY | xx W |
| 4 | | REMAINING MEMORY CAPACITY | x PIECES |
| 5 | MOVING SPEED | MOVING SPEED LEVEL | Low |
| 6 | ..... | ..... | ..... |

FIG. 15

| ID No. | ITEM (CATEGORY) | ITEM (INDEX) | REFERENCE VALUE (EXAMPLE) |
|---|---|---|---|
| 1 | COMMUNICATION QUALITY | RSRP | x1 dBm |
| 1 | REMAINING BATTERY CHARGE | REMAINING QUANTITY / REMAINING MEMORY CAPACITY | xx W / x PIECES |
| 2 | COMMUNICATION QUALITY | RSRQ | y1 dBm |
| 2 | REMAINING BATTERY CHARGE | REMAINING QUANTITY / REMAINING MEMORY CAPACITY | xx W / x PIECES |
| 3 | COMMUNICATION QUALITY | RSRP | x1 dBm |
| 3 | COMMUNICATION QUALITY | RSRQ | y1 dBm |
| 3 | REMAINING BATTERY CHARGE | REMAINING QUANTITY / REMAINING MEMORY CAPACITY | xx W / x PIECES |
| 4 | COMMUNICATION QUALITY | RSRP | x1 dBm |
| 4 | MOVING SPEED | MOVING SPEED LEVEL | Low |
| ? | ? |  |  |

FIG. 16

| PRIORITY | ITEM (CATEGORY) | ITEM (INDEX) | REFERENCE VALUE (EXAMPLE) |
|---|---|---|---|
| 0 | COMMUNICATION QUALITY | RSRP | x1 dBm |
| 0 | COMMUNICATION QUALITY | RSRQ | y1 dBm |
| 0 | REMAINING BATTERY CHARGE | REMAINING QUANTITY / REMAINING MEMORY CAPACITY | xx1 W / y1 PIECES |
| 0 | MOVING SPEED | MOVING SPEED LEVEL | Low |
| 1 | COMMUNICATION QUALITY | RSRP | x2 (< x1) dBm |
| 1 | COMMUNICATION QUALITY | RSRQ | y2 (< y1) dBm |
| 1 | REMAINING BATTERY CHARGE | REMAINING QUANTITY / REMAINING MEMORY CAPACITY | xx1 W / y1 PIECES |
| 4 | REMAINING BATTERY CHARGE | REMAINING QUANTITY / REMAINING MEMORY CAPACITY | xx2 (<xx1) W / y2 (<y1) PIECES |
| 5 | COMMUNICATION QUALITY | RSRP | x3 (< x2) dBm |
| 5 | MOVING SPEED | MOVING SPEED LEVEL | Medium |
| 7 | COMMUNICATION QUALITY | RSRP | x4 (< x3) dBm |

FIG. 19

| PRIORITY | ITEM (CATEGORY) | ITEM (INDEX) | REFERENCE VALUE (EXAMPLE) |
|---|---|---|---|
| 1 | COMMUNICATION QUALITY | RSRP | x1 dBm |
| 2 | COMMUNICATION QUALITY | RSRQ | y1 dBm |
| 3 | REMAINING BATTERY CHARGE | REMAINING QUANTITY / REMAINING MEMORY CAPACITY | xx1 W / y1 PIECES |
| 4 | MOVING SPEED | MOVING SPEED LEVEL | Medium |
| 5 | COMMUNICATION QUALITY | RSRP | x2 (> x1) dBm |
| 6 | COMMUNICATION QUALITY | RSRP | x3 (> x2) dBm |
| 7 | ? | | |

RADIO COMMUNICATION SYSTEM, RADIO TERMINAL, RADIO NETWORK, RADIO COMMUNICATION METHOD AND PROGRAM

This is a continuation of U.S. application Ser. No. 15/996,761, filed Jun. 4, 2018, which is a continuation of U.S. application Ser. No. 15/157,893, filed May 18, 2016, now U.S. Pat. No. 10,034,187, which is a continuation of U.S. application Ser. No. 14/284,596, filed May 22, 2014, now U.S. Pat. No. 9,894,544, which is a divisional application based upon U.S. patent application Ser. No. 13/520,596 filed Jul. 5, 2012, now U.S. Pat. No. 9,693,243, which is a National Stage of International Application No. PCT/JP2011/050047 filed Jan. 5, 2011, claiming priority based on Japanese Patent Application No. 2010-002365 filed Jan. 7, 2010, the contents of all of which are incorporated herein by reference in their entirety.

TECHNICAL FIELD

The present invention relates to a radio communication system, a radio terminal, a radio network, a radio communication method, and a program therefor.

BACKGROUND ART

It is being investigated in a 3GPP (3rd Generation Partnership Project) to cause radio terminals to measure/report information conventionally collected by drive-tests or information similar hereto so as to reduce operation cost (OPEX) that is needed for the drive-tests (Drive-Test) to be performed by operators (Non-patent literature t 1). The final goal of this investigation is to minimize execution of the drive-tests (Minimization of Drive-Tests: MDT. It is also called a substitute for the drive test (Drive Test Substitution)). In the feasibility study of the MDT, how the radio terminals are caused to measure the information and how the radio terminals are caused to report a log of the measurement results and the past measurement results are being discussed. Currently, the periodical reporting technique and the event triggered measurement reporting technique are specified. Additionally, what is herein called "the measurement" by the radio terminal also includes an operation of "detecting" some situations.

In the periodical technique, a radio network (for example, a radio base station) previously notifies a measurement interval and/or a report interval to the radio terminal, and the radio terminal performs the measurement and/or the reporting according hereto. Herein, as the periodic measurement, there exist the periodical quality measurements of the downlink pilot signals (Periodical downlink pilot measurements).

In the technology of the Non-patent literature 1, the radio terminal periodically performs the received quality measurement of the downlink pilot signals of serving cells (Periodical downlink pilot measurement), and periodically reports the measurement result. Herein, the so-called received quality measurement of the pilot signals is equivalent to measuring RSRP (Reference Signal Received Power), RSRQ (Reference Signal Received Quality), CPICH RSCP (Common Pilot Channel Received Signal Code Power), CPICH Ec/No (Ec: received energy per chip, No: Noise power density), and the like.

The details of the Non-patent literature 1 will be explained with 3GPP LTE (Long Term Evolution) exemplified by referencing FIG. 24.

The radio terminal (UE: User Equipment) notifies a function the radio terminal itself supports to the radio base station (eNB: enhanced Node B) (UE capability report).

A upper station (EPC: Evolved Packet Core, for example, NM: Network Manager), out of the radio networks, notifies a measurement policy (Measurement policy) to the eNB (Policy indication), and the eNB gives an instruction for the measurement and the reporting to the UE according to the above policy (Measurement logging and reporting configuration). Herein, it is assumed that the measurement and the reporting are performed at an interval T1 and at an interval T2, respectively.

The UE performs the received quality measurement of the downlink pilot signals (for example, the RSRP) and the positioning at the interval T1, maintains the measurement and the measurement result as a log (Logging), and reports the above log to the eNB at the interval T2 (Measurement report). In addition, the eNB reports the report coming from the UE to the upper NW (log report).

Hereinafter, likewise, the UE repeats a series of the operations of the measurement/positioning—the logging—the reporting.

Herein, for determining a lapse of the interval T1/T2, for example, a timer is used. Further, the UE finishes the above series of the operations when the UE is instructed to do so, for example, by the eNB.

Additionally, in some cases, for not only a serving cell but also a neighboring cell, the received quality measurement of the downlink pilot signals is performed periodically.

On the other hand, in the event trigger technique, the radio network (for example, the radio base station) previously notifies the condition, being a trigger for the measurement and/or the reporting, to the radio terminal, and the radio terminal performs the measurement and/or the reporting when the above condition is satisfied. Herein, the condition, being the trigger, includes, for example, a broadcast channel reception error (Broadcast Channel Failure), a paging channel reception error (Paging Channel Failure), the received quality of the serving cell becoming worse than a predetermined threshold (Serving Cell becomes worse than threshold), extra transmit power being less than a predetermined threshold (Transmit power headroom becomes less than threshold), a failure of a random access (Random access failure), and the like (Non-patent literature 2). Additionally, the radio terminal reports information of the time as well when the trigger has occurred together with the measurement result.

In addition, the radio terminal having a positioning function is instructed to perform the positioning as well periodically or a time point when the trigger has occurred, and to report location information.

In the technology of the Non-patent literature 2, the radio terminal performs the measurement (and the positioning) when the event is triggered, stores the result of the measurement (and the positioning) as the log, and reports it when the event is triggered. Herein, it is assumed that the condition under which the trigger of the measurement occurs is the paging channel reception error (Paging Channel Failure), and the radio terminal performs the received quality measurement of the downlink pilot signals of the serving cell at this time. Further, it is assumed that the condition under which the trigger of the reporting occurs is a time point when a predetermined amount of the logs have been accumulated, and the radio terminal reports the log to the radio network at this time.

The details of the technology of the Non-patent literature 2 will be explained with the 3GPP LTE exemplified by referencing FIG. 25.

The UE notifies functions the UE itself supports to the eNB (UE capability report).

The EPC (for example, NM) notifies a measurement policy (Measurement policy) to the eNB (Policy indication), and the eNB gives an instruction for the measurement and the reporting to the UE according to the above policy (Measurement logging and reporting configuration). Herein, it is assumed that the trigger of the measurement is the paging channel reception error, and the trigger of the reporting is a time point when the amount of the logs (a memory capacity of the terminal used for the logs) has reached a predetermined value.

The UE periodically receives the paging channels, performs the received quality measurement (for example, the RSRP) of the downlink pilot signals of the serving cell and the positioning thereof according to the above instruction when the paging channel reception error (Paging Channel failure) occurs, and maintains the measurement result and the positioning result together with the time of the occurrence of the paging channel reception error as the log (Logging). And, when the amount of the logs has reached a predetermined value, the UE reports the above logs to the eNB (Measurement report). In addition, the eNB reports the report coming from the UE to the upper NW (Log report).

Hereinafter, likewise, the UE repeats a series of the operations of the measurement/positioning—the logging—the reporting.

Herein, the UE finishes the above series of the operations when the UE is instructed to do so, for example, by the eNB.

Additionally, in some cases, for not only the serving cell but also the neighboring cell, the received quality measurement of the downlink pilot signals is performed when the trigger of the measurement occurs.

CITATION LIST

Non-Patent Literature

NON-PTL 1: 3GPP TR36.805v1.2.0 (internet<http://www.3gpp.org/ftp/Specs/html-info/36805.htm>)
NON-PTL 2: 3GPP R2-094291 (internet<http://www.3gpp.org/ftp/tsg_ran/WG2_RL2/TS GR2_67/Docs/R2-094191.zip>)

SUMMARRY OF INVENTION

Technical Problem

In the above-described technologies, the radio terminal performs the measurement/the reporting as instructed by the radio network. However, the measurement/the reporting for the MDT is basically a support function that the radio network expects for the radio terminal, and it is also thinkable that the measurement/the reporting is an excessive operation from a viewpoint of the radio terminal. For this, the following points at issue are expected.

When the radio terminal performs the periodical measurement/reporting like the case of the Non-patent literature 1, it always performs the measurement/the reporting at an indicated timing, whereby the problem surfaces that a battery is consumed due to transmitting the information that the above radio terminal originally does not need to transmit and a load on the terminal becomes large particularly when a remaining quantity of the battery is few.

Further, in a case of performing the measurement/the reporting when the event is triggered like the case of the Non-patent literature 2, for example, the radio terminal that is present in an environment in which the paging channel reception error more easily occurs results in performing the measurement/the positioning and the reporting more frequently. At this time, when many radio terminals are present in the identical environment (a certain specific scope), the case is expected in which it is not always necessary to cause all these radio terminals to perform the measurement/the reporting likewise. This causes, for example, a problem that an increase in the amount of the uplink radio resources to be used for the reporting due to the fact that many reporting terminals exist leads to a reduction in the uplink radio resource that can be used for transmitting the normal user's data, a problem that the radio terminal of which the remaining battery charge is few, as described above, excessively consumes the battery by measuring/reporting the information with a low necessity, and the like.

Thereupon, the present invention has been accomplished in consideration of the above-mentioned problems, and an object thereof is to provide a radio communication system, a radio terminal, a radio network, a radio communication method, and a program therefor capable of collecting information that the radio network side requires while alleviating a load on the terminal caused by the measurement/positioning and/or the reporting, and/or deleting the reporting of the information with a low necessity.

Solution to Problem

The present invention is a radio terminal having a function to collect and report measurement information to be indicated by a radio network, comprising: means that receives collection/reporting control information related to execution of at least one of the collection of the measurement information and the reporting of said measurement information to the radio network by the radio terminal; and controlling means that executes at least one of said collection and said reporting based on said collection/reporting control information when execution determination information related to at least one of the collection and the reporting of said measurement information by its own terminal satisfies a predetermined determination criterion.

The present invention is a radio communication system for collecting and reporting, by a radio terminal, measurement information to be indicated by a radio network, comprising: notifying means that notifies collection/reporting control information related to execution of at least one of the collection of the measurement information and the reporting of said measurement information to the radio network by the radio terminal; means that receives said collection/reporting control information; and controlling means that executes at least one of said collection and said reporting based on said collection/reporting control information when execution determination information related to at least one of the collection and the reporting of said measurement information by the radio terminal satisfies a predetermined determination criterion.

The present invention is a radio network in a radio communication system for collecting and reporting, by a radio terminal, measurement information to be indicated by the radio network, comprising a notifying means that notifies a determination criterion for determining execution of at least one of said collection and said reporting by said radio terminal based on execution determination information related to at least one of the collection and the reporting of said measurement information.

The present invention is a radio communication method of collecting and reporting, by a radio terminal, measurement information to be indicated by a radio network, comprising: receiving, by the radio terminal, collection/reporting control information related to execution of at least one of the collection of the measurement information and the reporting of said measurement information to the radio network; and executing, by the radio terminal, at least one of said collection and said reporting based on said collection/reporting control information when execution determination information related to at least one of the collection and the reporting of said measurement information by its own terminal satisfies a predetermined determination criterion.

The present invention is a radio communication method of collecting and reporting, by a radio terminal, measurement information to be indicated by a radio network, comprising: notifying collection/reporting control information related to execution of at least one of collection of the measurement information and reporting of said measurement information to the radio network by the radio terminal; receiving said collection/reporting control information; and executing at least one of said collection and said reporting based on said collection/reporting control information when execution determination information related to at least one of the collection and the reporting of said measurement information by the radio terminal satisfies a predetermined determination criterion.

The present invention is a program of a radio terminal having a function to collect and report measurement information to be indicated by a radio network, causing the radio terminal to execute the processes of: receiving collection/reporting control information related to execution of at least one of the collection of the measurement information and the reporting of said measurement information to the radio network by the radio terminal; and executing at least one of said collection and said reporting based on said collection/reporting control information when execution determination information related to at least one of the collection and the reporting of said measurement information by its own terminal satisfies a predetermined determination criterion.

Advantageous Effect of Invention

The present invention makes it possible to collect information that the radio network side requires while alleviating a load on the terminal caused by the measurement/positioning and/or the reporting, and/or deleting the reporting of the information with a low necessity.

BRIEF DESCRIPTION OF DRAWINGS

FIG. 7 is a view illustrating one example of the determination criterion information.

FIG. 8 is a view illustrating one example of the determination criterion information.

FIG. 13 is a view illustrating one example of the determination criterion information.

FIG. 14 is a view illustrating one example of the determination criterion information.

FIG. 15 is a view illustrating one example of the determination criterion information.

FIG. 16 is a view illustrating one example of the determination criterion information.

FIG. 19 is a view illustrating one example of a table that the radio terminal (UE) 30 stores.

DESCRIPTION OF EMBODIMENTS

Figure 1:
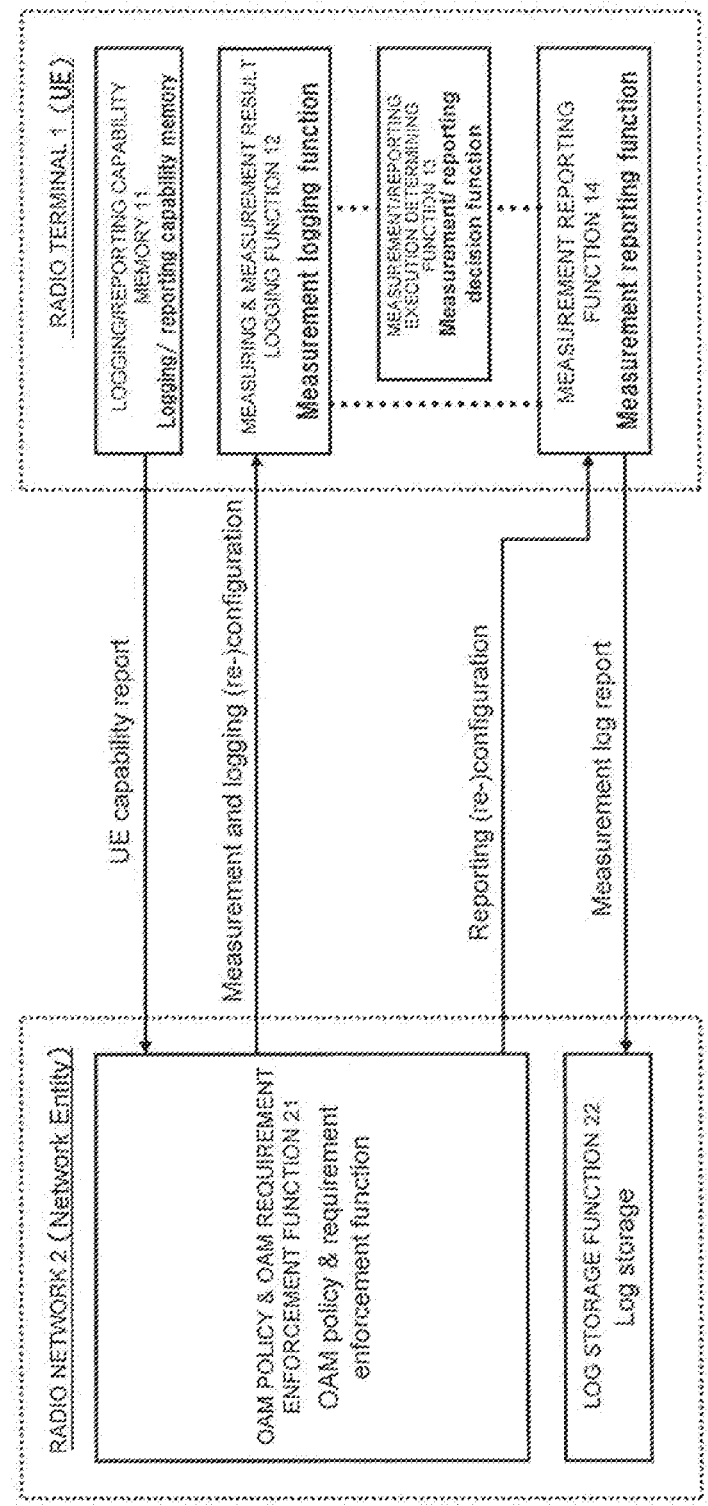
FIG. 1 is a functional constitution view of this exemplary embodiment.

The exemplary embodiments of the present invention will be explained.

The radio terminal having a function to collect and report the measurement information to be indicated by the radio network receives collection/reporting control information related to execution of at least one of the collection of the measurement information and the reporting of the aforementioned measurement information to the radio network by the radio terminal. And, the exemplary embodiment is characterized in that the radio terminal executes, based on the aforementioned collection/reporting control information, at least one of the aforementioned collection and reporting when execution determination information related to at least one of the collection of the aforementioned measurement information and the reporting of thereof by its own terminal satisfies a predetermined determination criterion.

Herein, the so-called execution determination information is information related to at least one of the measurement and the reporting of measurement log, which corresponds to the logs of the measurement results, by the radio terminal, and a concept including a terminal situation of the radio terminal and/or a collection situation of the measurement information, and the like. For example, as the terminal situation of the radio terminal, there exist the remaining battery charge of the radio terminal (an absolute value of the remaining battery charge, a quantized value thereof, an identification number (ID No.) previously associated with the remaining battery charge, a memory capacity of the battery, and the like), location information of the radio terminal (GPS, Cell, TA: Tracking Area, information of the outdoors/indoors, or location information acquired by other position detecting means (for example, OTDOA: Observed Time Difference Of Arrival Technique)), a communication quality (for example, RSRP, RSPQ, CPICH RSCP, and CPICH Ec/No), a moving speed (velocity) (an absolute value of the moving speed, a quantized value thereof, an ID No. previously associated with the moving speed, a pre-specified level of the moving speed, and the like), received strength of a GPS radio wave, and the like.

Further, as the collection situation of the measurement information, there exist a sort of the collected measurement information (for example, a pre-specified ID No., a category, and the like), an amount of the collected measurement information (the number of times of the measurements, a memory usage amount of the radio terminal (UE memory usage), and the like), a location in which the measurement information has been collected, a summary of the collected measurement information (for example, a sort of the measurement information, respective numbers of times of the measurements for the above sort of the measurement information, information of the time when the measurement has been performed, information of the location in which the measurement has been performed (GPS, Cell, TA: Tracking Area), information of the outdoors/indoors, and the like), the moving speed, and the like, but the collection situation is not limited hereto.

Herein, it is thinkable that the information of the outdoors/indoors can be acquired from, for example, whether the received strength of the radio wave to be used for acquiring the location information such as the GPS radio wave is equal to or more than a predetermined value, or less than it, whether the radio terminal is connected to an in-house small-size base station that is called HNB (Home NodeB) or HeNB (Home eNodeB) (detectable with PCI: Physical Cell ID), and the like. Further, with the moving speed, the case in which the moving speed can be actually measured with an acceleration sensor etc. mounted, and the case in which the moving speed is estimated based on the number (or frequency) of handovers or the number (or frequency) of re-selection of the cell are thinkable.

Further, the predetermined determination criterion may be previously maintained by the radio terminal itself in some cases, or may be notified as the determination criterion information from the radio network in other cases. In addition, when the determination criterion information is notified, the method of notifying an item to be used for the execution determination and a corresponding determination criterion value may be used in some cases, or the method of previously specifying the item to be used for the execution determination and the corresponding determination criterion value as a table and providing only an ID No. (item No.) may be used in some cases. Additionally, the case in which the determination criterion value may not be necessary depending on the item is also thinkable.

Further, the collection of the measurement information and the reporting of the collected measurement information by the radio terminal may be executed not only when all the predetermined determination criteria are satisfied, but also when a priority is provided for the item to be included in the execution determination information and the radio terminal satisfies a certain amount of priority.

Additionally, basically, the terminal situation is preferably used as the execution determination information when it is determined whether the collection of the measurement information is executable or not, and the terminal situation and/or the collection situation are preferably used as the execution determination information when it is determined whether the reporting of the collected measurement information is executable or not. However, the determination of the execution is not limited hereto.

Next, specific determination examples using the above-described execution determination information will be explained.

For example, in a case in which the execution determination information is the communication quality, the radio terminal performs the collection (or the reporting) of the measurement information when the communication quality of the radio terminal is less than (or equal to or more than) a predetermined threshold (determination criterion), and the radio terminal does not perform it when the communication quality is equal to or more than (or less than) the threshold. Further, in a case in which the execution determination information is the remaining battery charge, the radio terminal performs the collection (and/or the reporting) of the measurement information when the remaining battery charge is equal to or more than a predetermined threshold (determination criterion), and the radio terminal does not perform it when the remaining quantity is less than the predetermined threshold. Further, in a case in which the execution determination information is the location of the radio terminal, the radio terminal performs the collection (and/or the reporting) of the measurement information when the location of its own terminal is equivalent to a predetermined scope (determination criterion), and the radio terminal does not perform it otherwise. Further, in a case in which the execution determination information is the moving speed of the radio terminal, the radio terminal performs the collection (and/or the reporting) of the measurement information when the moving speed of its own terminal is equal to or less than a predetermined level (determination criterion), and the radio terminal does not perform it when the moving speed is higher.

Additionally, as the measurement information, being a target that the radio terminal collects, the periodical quality measurement of the downlink pilot signals (Periodical downlink pilot measurements) is thinkable with the periodical method. On the other hand, with the event-triggered method, there exist the broadcast channel reception error (Broadcast Channel Failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (Random access (RA) failure), the radio link disconnection (Radio Link Failure: RLF), and the like. Further, with the case of the broadcast channel reception error (Broadcast Channel Failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (RA failure), and the radio link disconnection (RLF), it is also thinkable to collect the communication quality (for example, the RSRP, the RSRQ, the CPICH RSCP, and the CPICH Ec/No) of own cell (Serving cell) and/or the neighboring cells (Neighboring cell (s)) as well. In addition, it is also thinkable to collect the information of the location and the information of the time as well together. Additionally, this is only example, and the application target of the present invention is not limited hereto.

Further, as the trigger of the radio terminal's performing the reporting of the collected measurement information, there exist an absolute time (Absolute time based), on demand from the radio network (for example, the radio base station) (On demand), periodical expiration of the timer (Periodical timer based), a terminal memory usage amount (an amount of the logs) (UE memory usage based), the location of the terminal (Location based), a combination of the above-mentioned items (Combined triggers), and the like; however, the trigger is not limited hereto.

Additionally, what is herein called "the collection" signifies acquiring certain information by use of "the measurement" and "the detection", and storing "the above acquired result". Hereinafter, the measurement or the detection, an acquisition operation of information that is executed relatively hereto, and an operation in accordance therewith are described (defined) together as "a measurement" except for the case of particularly classifying and explaining the collection in details. Further, the measurement information, being information that the radio terminal acquires by use of the above broadly sensed "measurement" and stores, is defined as "a measurement log". In addition, hereinafter, it is premised that the result obtained by performing the measurement is stored unless otherwise specified, so the description on the explanation of an operation of "storing the measured result" is omitted.

FIG. 1 is a functional constitution view of this exemplary embodiment.

As shown in FIG. 1, the radio communication system of this exemplary embodiment, which is a radio communication system that collects the information by causing the radio terminals to measure/report the information that the radio network requires, includes a radio terminal 1 (UE) and a radio network 2.

The radio terminal 1 (UE) has a logging/reporting capability memory 11 (Logging/reporting capability memory), a measuring & measurement result logging function 12 (Measurement logging function), a measurement/reporting execution determining function 13 (Measurement/reporting decision function), and a measurement reporting function 14 (Measurement reporting function).

The radio network 2 has an OAM (Operation/Administration/Maintenance) policy & OAM requirement enforcement function 21 (OAM policy & requirement enforcement function) and a log storage function 22 (Log storage).

In the radio communication system of this exemplary embodiment, the logging/reporting capability memory 11 of the radio terminal 1 firstly performs a terminal capability report related to a logging capability and a reporting capability (UE capability report). What is herein called the terminal capability report is a report of notifying a function that radio terminal 1 inherently includes (for example, existence or not of the measurement function of the communication quality or the GPS function, or detailed information related hereto).

And, the OAM policy & OAM requirement enforcement function 21 of the radio network 2 references the above terminal capability report (UE capability report), decides the measurement method or the logging method of the measurement result of the above radio terminal 1 (Measurement and logging configuration), and the reporting method (Reporting configuration), and gives an instruction to the radio terminal 1.

Further, the OAM policy & OAM requirement enforcement function 21 of the radio network 2 transmits the necessary predetermined determination criterion described above (only item (index) to be used for the execution determination, a reference value, an ID No. and a priority level corresponding to the item (index), and the like).

The measurement/reporting execution determining function 13 of the radio terminal 1 determines whether the execution determination information of its own terminal (for example, terminal situation) satisfies a predetermined determination criterion, and determines whether or not to perform the measurement (and/or the reporting). And, in a case of performing the measurement, the measurement/reporting execution determining function 13 performs the measurement, and logs the measurement result according to the instructed measurement method and logging method.

Additionally, as a measurement (or detection) target for which the radio terminal maintains the result as the measurement log, there exist the periodical quality measurement of the downlink pilot signals (Periodical downlink pilot measurements), the broadcast channel reception error (Broadcast Channel failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (Random access (RA) failure), the radio link disconnection (Radio link failure: RLF), and the like. Further, with the case of the broadcast channel reception error (Broadcast Channel Failure), the paging channel reception error (Paging Channel Failure), the received quality of the serving cell becoming worse than a predetermined threshold (Serving Cell becomes worse than threshold), the extra transmit power being less than a predetermined threshold (Transmit power headroom becomes less than threshold), the failure of the random access (RA failure), and the radio link disconnection (RLF), it is also thinkable to collect the communication quality (for example, the RSRP, the RSRQ, the CPICH RSCP, and the CPICH Ec/No) of the above cell (Serving cell) and/or the neighboring cell(s) (Neighboring cell(s). In addition, it is also thinkable to log the information of the location and the information of the time together obtained by performing the above measurement (or detection) for all items (or one part thereof) that the radio terminal measures (or detects). Additionally, this is only example, and the application target of the present invention is not limited hereto.

In a case of performing the measurement or the reporting, the measurement reporting function 14 performs the measurement, logs its result as the measurement log, and performs the reporting of the measurement log to the radio network 2 according to the instructed measurement method and reporting method (Measurement log report).

This makes it possible to collect the information that the radio network side requires while alleviating a load on the terminal caused by the measurement and/or the logging of the above measurement result, and/or deleting the reporting of the information with a low necessity.

Additionally, the above-described message to be transmitted from the radio terminal to the radio network, and the above-described message to be transmitted from the radio network to the radio terminal can be realized with RRC (Radio Resource Control) signaling and MAC (Medium Access Control) signaling; however the signaling is not limited hereto.

Specific exemplary embodiments will be explained below.

First Exemplary Embodiment

The first exemplary embodiment will be explained. The case of supposing a system of the 3GPP LTE (Long Term Evolution) will be explained in the first exemplary embodiment.

Figure 2:
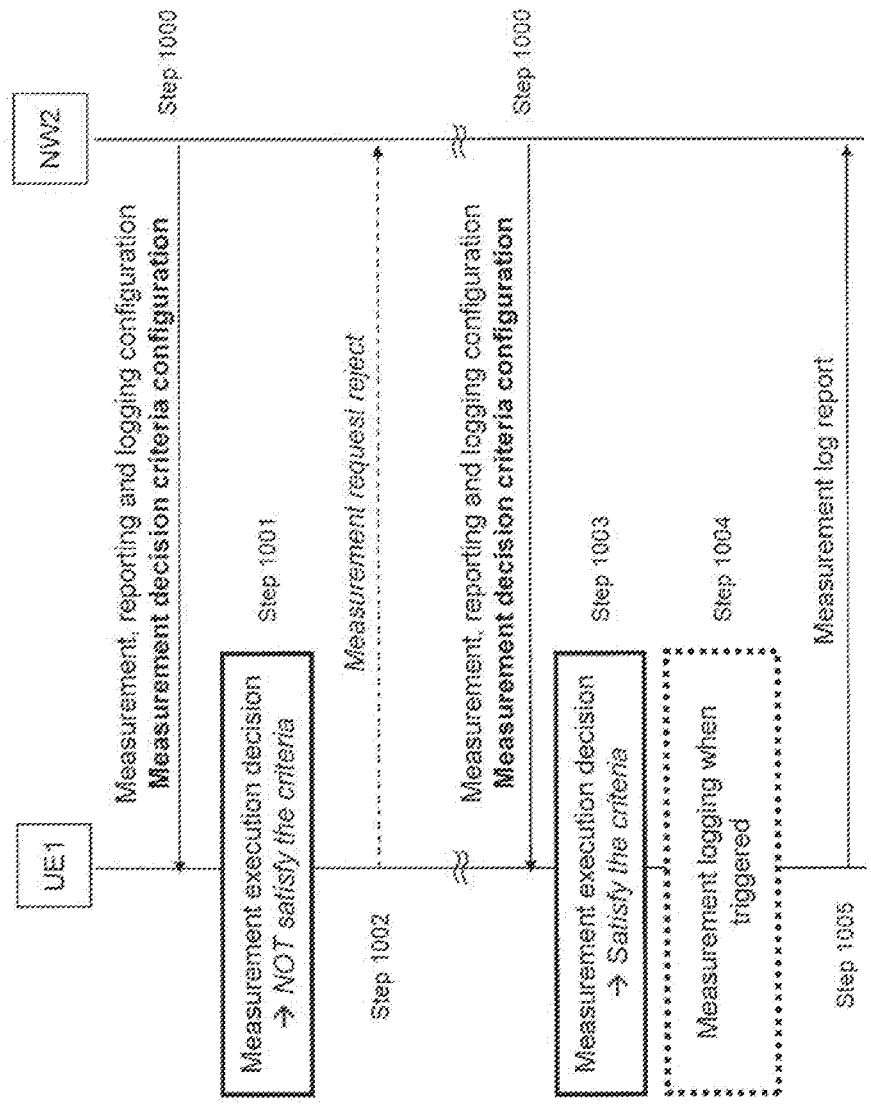
FIG. 2 is a sequence diagram for explaining a specific operation of a first exemplary embodiment.

FIG. 2 is a sequence diagram for explaining a specific operation of the first exemplary embodiment.

At first, the radio network (NW) 2 notifies, to the radio terminal (UE) 1, the configuration information including the collection/reporting/control information showing the measurement method, the logging method, and the reporting method (Measurement, reporting and logging configuration), and the determination criterion information (Measurement decision criteria configuration) that is used for the execution determination of the measurement and/or the reporting in the radio terminal (UE) 1 (Step 1000). What is herein called the above configuration information could be a message for notifying various sorts of the configurations of the radio terminal in some cases (RRC Connection Reconfiguration), or may be defined as an independent separate message in some cases.

The radio terminal (UE) 1 determines whether or not the execution determination information that radio terminal 1 stores satisfies the determination criterion of the notified determination criterion information (Measurement execution decision) (Step 1001). The radio terminal (UE) 1 does not perform a process of the measurement/the reporting when it does not satisfy the determination criterion. At this time, the radio terminal (UE) 1 may transmit a reject (impossibility) message of the measurement/the reporting (Measurement request rejection) (Step 1002). On the other hand, the radio terminal (UE) 1 performs the measurement, the logging of the measurement result, and the reporting as instructed in the collection/reporting control information (Steps 1004 and 1005) when it satisfies the determination criterion (Step 1003).

This makes it possible to cause the radio terminal to perform the measurement and/or the reporting without (excessively) increasing a load on the radio terminal caused by the measurement and/or the reporting while taking the terminal situation of the radio terminal etc. into consideration.

Herein, the radio network (NW) can perform, for example, optimization etc. of parameters constituting the radio network using the collected information.

Additionally, while the target of the execution determination based on the execution determination information was both of the measurement and the reporting in this example, the target could be only the measurement. For example, when the periodical measurement and reporting are instructed, the radio terminal (UE) 1 determines whether to perform the measurement whenever the trigger of the measurement occurs, and may report the measurement logs maintained until the trigger has occurred, if they actually exist, without performing the execution determination particularly. Further, as a node of the radio network (NW) for performing the operation in this example, for example, a base station controller (RNC), the radio base station (NB/eNB/BTS), the NM, the DM and the like are thinkable; however the node is not limited hereto.

Second Exemplary Embodiment

The second exemplary embodiment will be explained. The case of supposing a system of the 3GPP LTE (Long Term Evolution) will be explained in the second exemplary embodiment.

Figure 3:
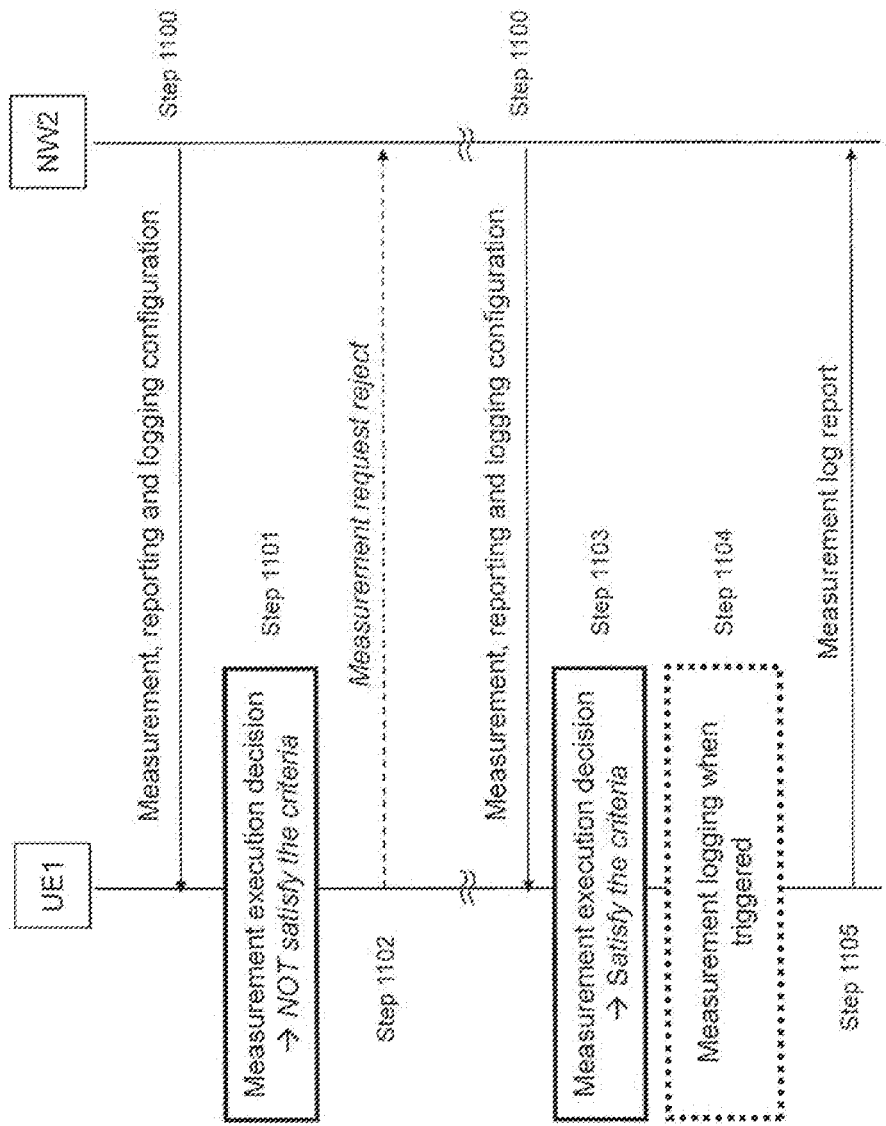
FIG. 3 is a sequence diagram for explaining a specific operation of a second exemplary embodiment.

FIG. 3 is a sequence diagram for explaining a specific operation of the second exemplary embodiment.

At first, the radio network (NW) 2 notifies, to the radio terminal 1 (UE), the configuration information including the collection/reporting control information showing the measurement method, the logging method, the reporting method (Measurement, reporting and logging configuration) (Step 1100).

The radio terminal (UE) 1 determines whether or not the execution determination information that radio terminal (UE) 1 stores satisfies a pre-specified determination criterion that the radio terminal (UE) 1 stores (Measurement execution decision) (Step 1101). The radio terminal (UE) 1 does not perform a process of the measurement/the reporting when it does not satisfy the determination criterion. At this time, the radio terminal (UE) 1 may transmit a reject (impossibility) message of the measurement/the reporting (Measurement request rejection) (Step 1102). On the other hand, the radio terminal (UE) 1 performs the measurement, the logging of the measurement result, and the reporting as instructed in the collection/reporting control information (Steps 1104 and 1105) when it satisfies the determination criterion (Step 1103).

This makes it possible to cause the radio terminal to perform the measurement and/or the reporting without (excessively) increasing a load on the radio terminal caused by the measurement and/or the reporting while taking the terminal situation of the radio terminal etc. into consideration.

Herein, the radio network (NW) can perform, for example, optimization etc. of parameters constituting the radio network using the collected information.

Additionally, while the target of the execution determination based on the execution determination information was both of the measurement and the reporting in this example, the target could be only the measurement. For example, when the periodical measurement and reporting are instructed, the radio terminal (UE) 1 determines whether to perform the measurement whenever the trigger of the measurement occurs, and may report the measurement logs maintained until the trigger has occurred, if they actually exist, without performing the execution determination particularly.

Further, as a node of the radio network (NW) for performing the operation in this example, for example, the base station controller (RNC), the radio base station (NB/eNB/BTS), the NM, the DM and the like are thinkable; however the node is not limited hereto.

In addition, a specific exemplary embodiment will be explained below.

Third Exemplary Embodiment

The third exemplary embodiment will be explained. The case of supposing a system of the 3GPP LTE (Long Term Evolution) will be explained in the first exemplary embodiment.

Figure 4:
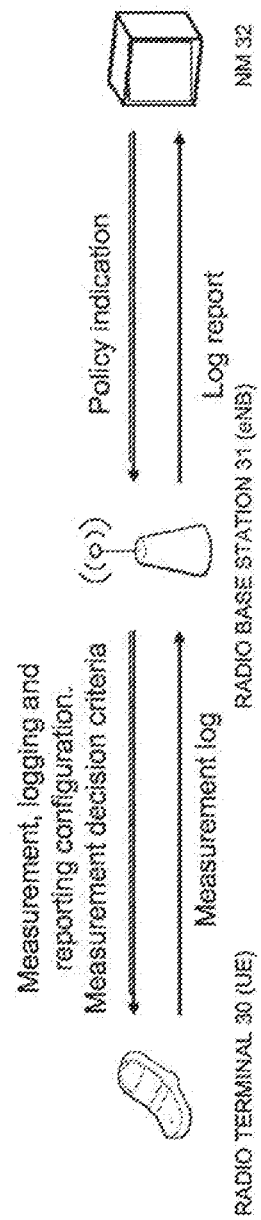
FIG. 4 is a constitution view of the radio communication system in a third exemplary embodiment.

FIG. 4 is a constitution view of the radio communication system in the third exemplary embodiment.

An NM (Network Manager) 32 notifies a policy of the measurement, the logging of the measurement result, and the reporting of the above logging by the terminal to a radio base station (eNB) 31 (Policy indication). As a target of this policy, for example, the minimization of the drive test (MDT: Minimization of Drive Test. Or it is also called a substitute for the drive test (Drive Test Substitution)) and the like are thinkable.

The radio base station (eNB) 31 incorporates both of the collection/reporting control information related to the measurement method, the logging method, and the reporting method (Measurement, logging and reporting configuration), and the determination criterion information of the measurement (Measurement decision criteria) into the configuration information to be notified to the radio terminal (UE) 30 based on a policy of the measurement, the logging of the measurement result, and the reporting of the above logging (Policy indication), and notifies it.

The radio terminal (UE) 30 reports the log of the measurement result (measurement log) to the radio base station (eNB) 31 (Measurement log report).

The radio base station (eNB) 31 reports an entirety or one part of the measurement logs reported from the radio terminal (UE) 30 to a upper NM 32 (Log report).

Figure 5:
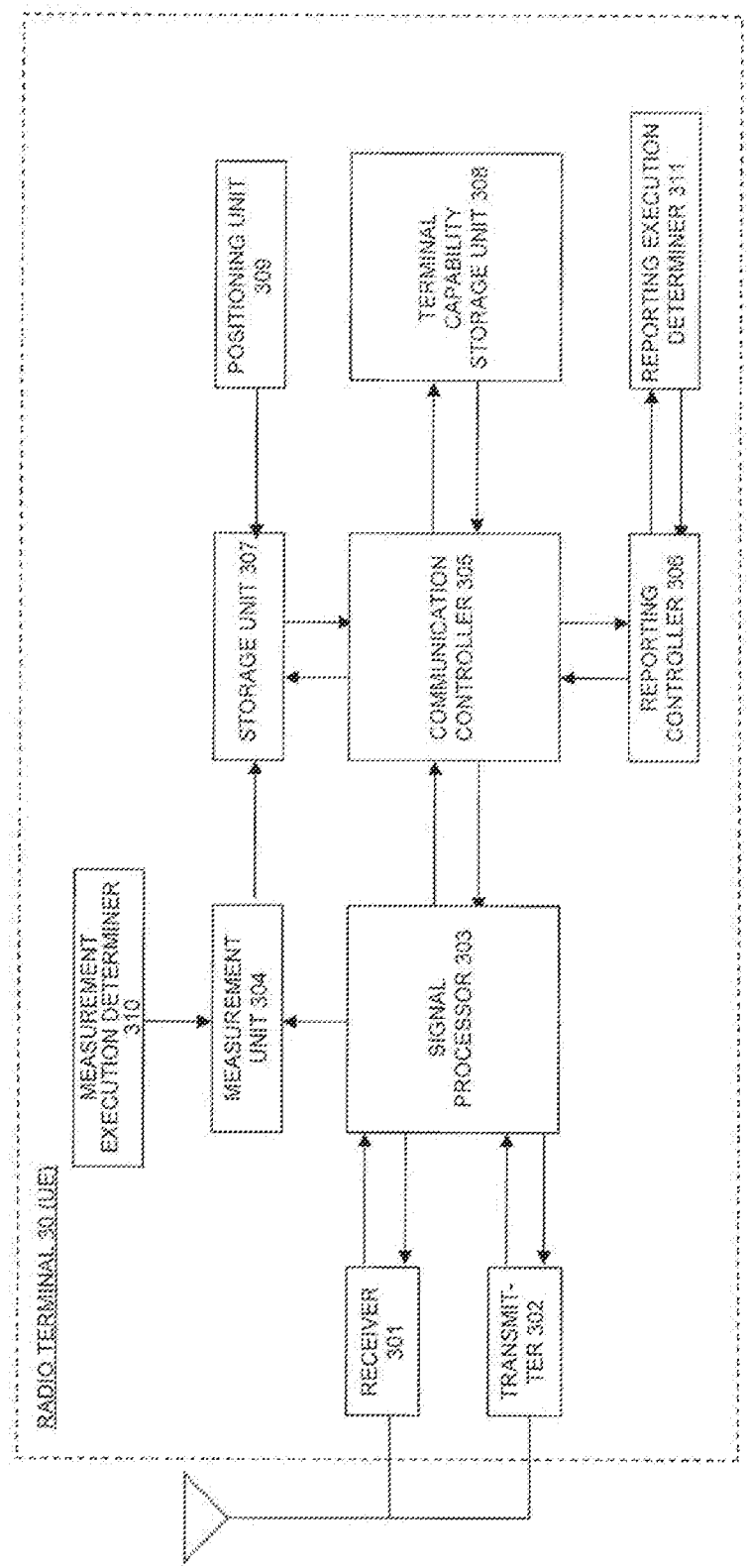
FIG. 5 is a block diagram of a radio terminal (UE) 30.

Next, a constitution of the radio terminal (UE) 30 will be explained. FIG. 5 is a block diagram of the radio terminal (UE) 30.

A transmitter 301 or a receiver 302 performs the transmission/reception of signals to/from the radio base station.

A signal processor 303 performs generation of transmission signals/demodulation of reception signals.

A communication controller 305 gives an instruction for generating the transmission signals and recovering the information to the signal processor 303.

A terminal capability storage unit 308 is a part for storing the capability etc. related to the measurement and the reporting of the above terminal, and the capability etc. is read out responding to a necessity.

A measurement execution determiner 310 determines whether or not the execution determination information such as the terminal situation satisfies a predetermined determination criterion (when determining whether to perform the measurement), and decides whether to perform the measurement.

A measurement unit 304 measures or detects the target indicated by the radio base station when the execution of the measurement has been decided by the measurement execution determiner 310.

A storage unit 307 stores the information measured or detected by the measurement unit 304, and the above information is read out according to a necessity.

A positioning unit 309 performs the positioning at the moment that the measurement unit 304 has measured the target indicated by the radio base station 31. Herein, the positioning includes not only the location detection by the GPS etc. but also the reading-out of the information of the area (cell, TA and the like) in which the radio terminal stays, the acquisition of the information as to whether the target exists outdoors or indoors, the location information acquiring methods other than it (for example, an OTDOA technique), and the like.

A reporting execution determiner 311 determines whether or not the execution determination information such as the terminal situation satisfies a predetermined determination criterion (when determining whether to perform the reporting), and decides whether to perform the reporting.

In a case in which it has been decided by the reporting execution determiner 311 to perform the reporting, a reporting controller 306 gives an instruction for reporting the stored measurement log to the radio base station 31 when the condition indicated by the radio base station 31 or the pre-specified condition is satisfied.

Figure 6:
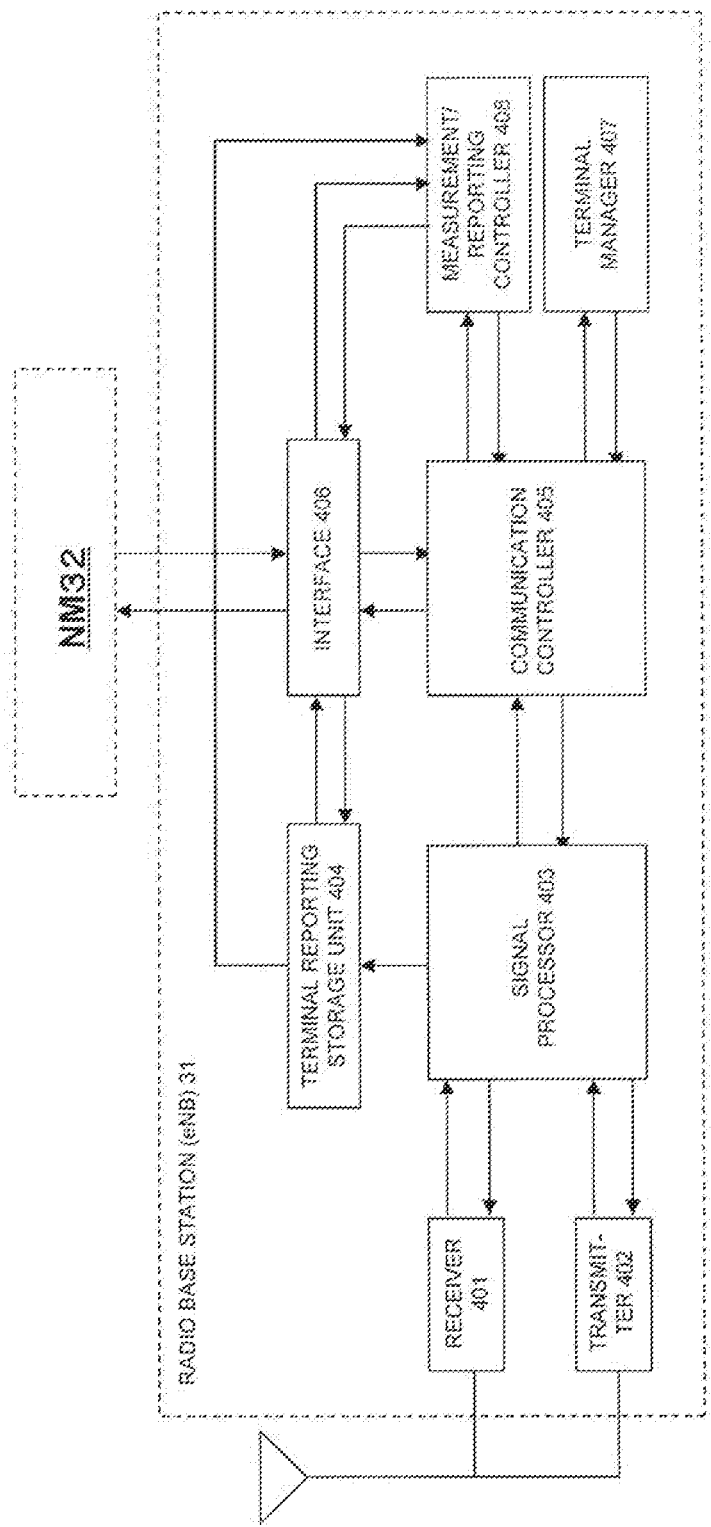
FIG. 6 is a block diagram of a radio base station (eNB) 31.

Continuously, a constitution of the radio base station (eNB) 31 will be explained. FIG. 6 is a block diagram of the radio base station (eNB) 31.

A receiver 402 or a transmitter 401 performs the transmission/reception of signals to/from the radio terminal.

A signal processor 403 performs generation of transmission signals/demodulation of reception signals.

A communication controller 405 gives an instruction for generating the transmission signals and recovering the information to the signal processor.

A terminal manager 407 separately manages respective situations of a plurality of the radio terminals.

An interface 406 performs the transmission/reception of the information to/from a upper station NM 32.

A terminal reporting storage unit 404 is a part for storing the measurement information reported from the radio terminal 30, and the stored measurement information and the like are reported to the upper station NM 32 via the interface 406 responding a necessity.

A measurement/reporting controller 409, which is a part for controlling the measurement/the reporting by the radio terminal (UE) 30 based on the policy to be indicated by the upper station NM, transmits the determination criterion information to the radio terminal (UE) 30 in this embodiment. One example of the determination criterion information (Measurement decision criteria configuration) is shown in FIG. 7.

With the determination criterion information shown in FIG. 7, the item (index) and the reference value are associated with the item (category), and for example, with the case in which the item (category) is the communication quality, RSRP/RSRQ (in a case of the LTE), being the items (indexes) and x1 dBm/x2 dBm, being the reference values thereof are associated with the communication quality. Further, with the case in which the item (category) is the remaining battery charge, its remaining quantity, being the item (index), and xx W, being the reference value thereof, are associated with the remaining battery charge, and the remaining memory capacity, being its item (index), and x pieces, being its reference value, are associated with the remaining memory capacity. As the other items (categories), there exit the location of the terminal and the moving speed. Additionally, the item (category) may not be notified to the radio terminal. Further, the determination criterion information shown in FIG. 7 is only example, and is not limited hereto.

With the determination criterion information shown in FIG. 8, the item (index) and the reference value are associated with the item (category), and as the item (category), there exist the sort of the log (the sort of the collected measurement information), the amount of the logs (the amount of the collected measurement information), the acquisition location of the log (the location in which the measurement information has been acquired), the acquisition time of the log (the time when the measurement information has been collected), and the like. For example, in a case of using the sort of the log, when the item (index) is notified and the radio terminal stores the corresponding sort of the logs, the radio terminal reports only them to the radio network. In this case, the reference value is not required particularly. On the other hand, in case of using the amount of the logs, the method of using the memory usage amount of the radio terminal for the index is thinkable. Further, in a case of using the acquisition location and the acquisition time of the log, the radio terminal compares the location information and the time information that the radio terminal actually stores with the notified reference values, and performs the determination. Additionally, these items may be used one by one in some cases, or a combination thereof may be used in some cases. While the determination criterion shown in FIG. 8 is preferably used for the determination of the log reporting execution basically, they may be used for the determination of the measurement execution.

Hereinafter, an example of using the determination criterion based on the terminal situation as shown in FIG. 7 and the corresponding execution determination information is shown; however, needless to say, it is also possible to use the method based on the collection situation of the measurement information (measurement log) as shown in FIG. 8.

Figure 9:
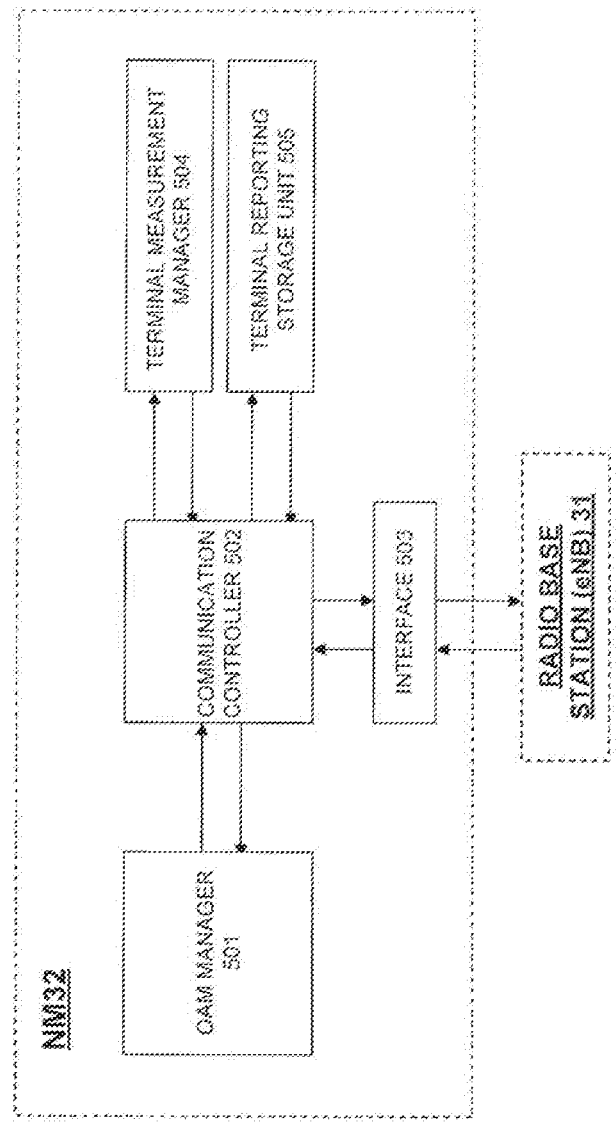
FIG. 9 is a block diagram of an NM 32.

Continuously, a constitution of the NM 32 will be explained. FIG. 9 is a block diagram of the NM 32.

An OAM manager 501 performs an operation/administration/maintenance of an entirety of the radio network.

A communication controller 502 performs a control of transmitting/receiving the information to/from other radio network nodes, for example, the radio base station via the interface.

A terminal measurement manager 504 decides the information that needs to be collected, decides a policy for the above collection, and notifies it to the radio base station via an interface 503.

A terminal reporting storage unit 505 stores the measurement information reported from the radio terminal, and the above measurement information is read out according to a necessity. The read-out measurement information is used for the optimization of the radio network and the like.

Next, an operation of the radio system constituted as described above will be explained.

Figure 10:
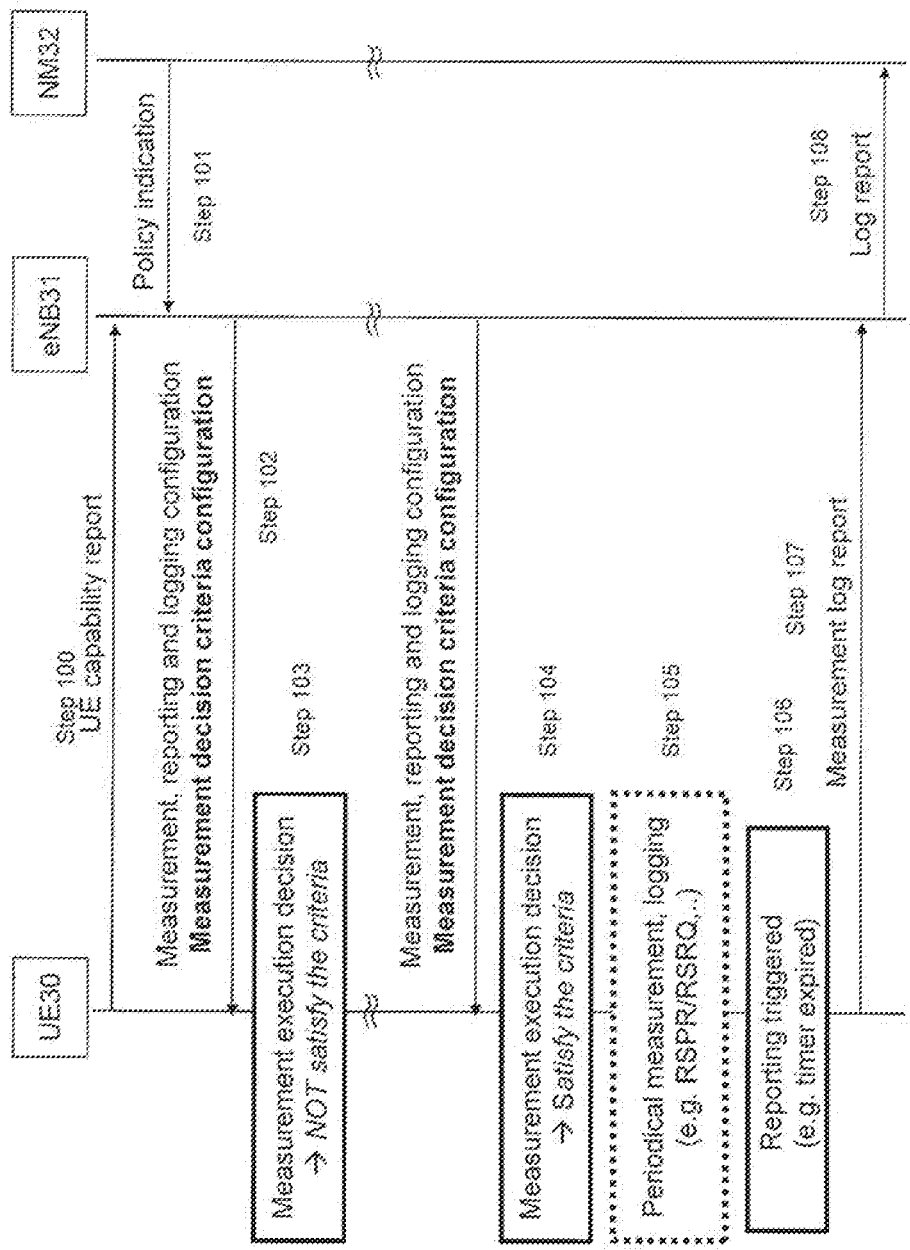
FIG. 10 is a sequence diagram for explaining a specific operation of the third exemplary embodiment.

FIG. 10 is a sequence diagram for explaining a specific operation of the third exemplary embodiment.

Additionally, in the following, an example will be explained of notifying, by the radio base station (eNB) 31, the details (the item and the reference value) of the determination criterion information that is used for the execution determination, and executing, by the radio terminal, the measurement/the reporting when the execution determination information of the radio terminal (UE) 30 satisfies the notified determination criterion. Further, in this example, it is assumed that the measurement/the reporting by the radio terminal (UE) 30 is periodically performed based on the timer to be notified from the radio base station (eNB) 31.

At first, the radio terminal (UE) 30 performs the terminal capability reporting (UE capability report) (Step 100).

The NM 32 notifies the measurement policy (Measurement policy) to the radio base station (eNB) 31 (Step 101).

The radio base station (eNB) 31 sends a timer value of the measurement interval at which the radio terminal (UE) 30 performs the measurement, and a timer value of the report interval at which the measurement log is reported based on the measurement policy (Measurement policy). Further, in this exemplary embodiment, the radio base station (eNB) 31 transmits to the radio terminal (UE) 30 the determination criterion information as well that the radio terminal (UE) 30 uses (Measurement decision criteria configuration) (Step 102). Additionally, it is assumed in the following explanation that the item (index) is the remaining battery charge and the determination criterion value is xxW with regard to the determination criterion information to be transmitted to the radio terminal (UE) 30 (Measurement decision criteria configuration).

The radio terminal (UE) 30 determines whether or not the execution determination information (the terminal situation etc.) of its own terminal satisfies the notified determination criterion (Measurement execution decision) (step 103). For example, the radio terminal (UE) 30 determines whether the terminal situation of the radio terminal (UE) 30 is the remaining battery charge=xx or more. Additionally, the remaining memory capacity may be used instead of the remaining battery charge. The radio terminal (UE) 30 does not perform the process of the measurement/the reporting when this determination criterion is not satisfied. At this time, the radio terminal (UE) 30 may transmit the reject message (Reject) of the measurement/the reporting similarly to the case of the above-described first and second exemplary embodiments (not shown in the figure).

On the other hand, when the execution determination information (the terminal situation etc.) of its own terminal satisfies the determination criterion (Step 104), the radio terminal (UE) 30 performs the measurement at the measurement interval based on the notified timer value and logs the measurement result according to the instructed measurement method and reporting method (Measurement logging)(Step 105).

The radio terminal (UE) 30 transmits the measurement log report to the radio base station (eNB) 31 by use of the received radio resource (Measurement log report) (Step 107) when the timer of the report interval expires (Step 106). And, the radio base station (eNB) 31 transmits an entirety or one part of the received measurement logs to the NM 32 (Log report) (Step 108).

This makes it possible to cause the radio terminal to perform the measurement and the reporting without (excessively) increasing a load on the radio terminal.

Additionally, in FIG. 10, the timing at which the NM 32 notifies (Policy indication) the measurement policy (Measurement policy) to the radio base station (eNB) 31 is a timing after receiving the terminal capability report (UE capability report); however, the timing is not limited hereto, and other timings such as a timing prior to the reception of the terminal capability report (UE capability report) may be used. Further, the radio base station (eNB) 31 may previously maintain the measurement policy (Measurement policy) in some cases, and it is not indispensable that the NM 32 notifies (Policy indication) the measurement policy (Measurement policy) when the radio base station (eNB) 31 maintains the measurement policy.

In addition, while the present invention was applied in the technique of periodically performing the measurement/the reporting in this example, needless to say, the present invention may be applied in the technique of the event trigger.

Figure 11:
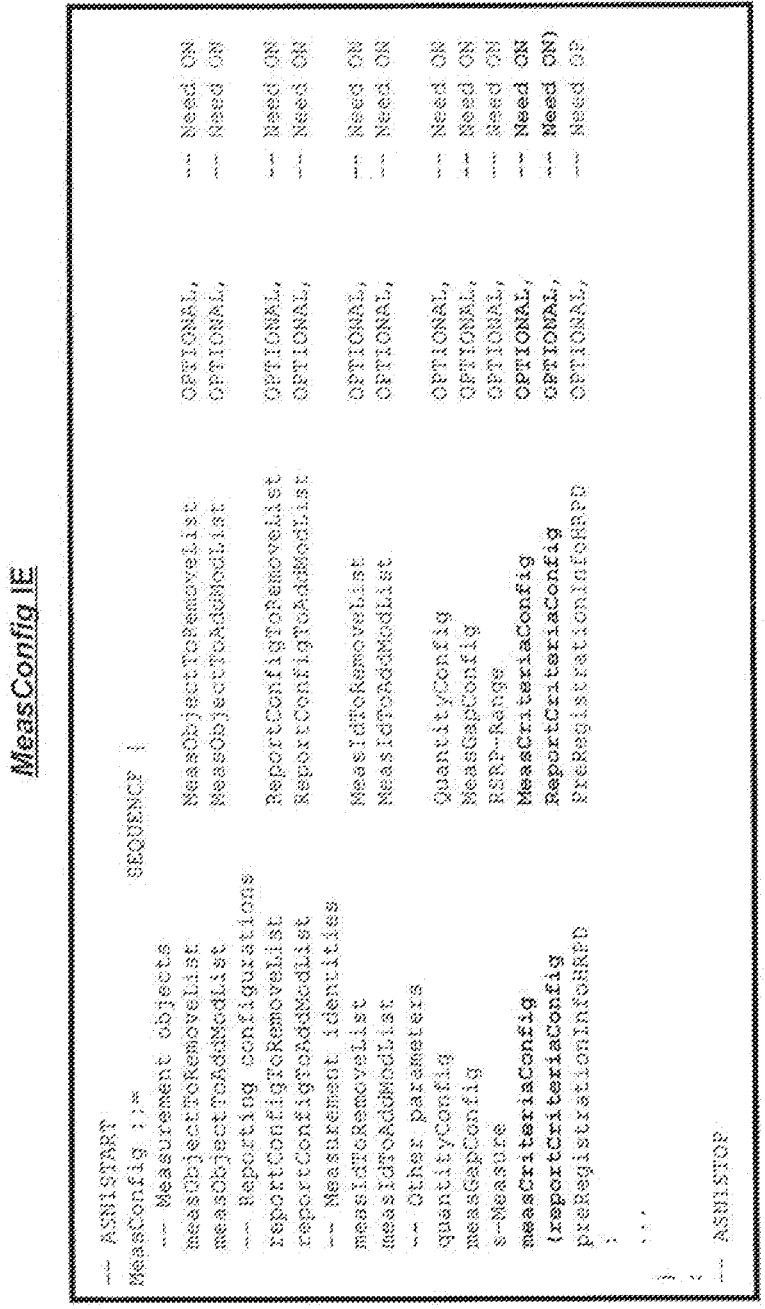
FIG. 11 is a view for explaining the third exemplary embodiment.

Additionally, as a method of notifying the determination criterion information (Measurement decision criteria) that is notified from the radio base station (eNB) to the radio terminal (UE) in this example, the RRC signaling is thinkable. In this case, for example, as shown in FIG. 11, into an message for notifying the configuration of the operation of the measurement and the reporting by the radio terminal (UE), which is called "MeansConfig IE (IE: Information Element), may be incorporated the above determination criterion information (Measurement decision criteria) as "MeansCriteriaConfig" to notify it.

Next, an operation of the radio terminal (UE) 30 will be explained.

Figure 12:
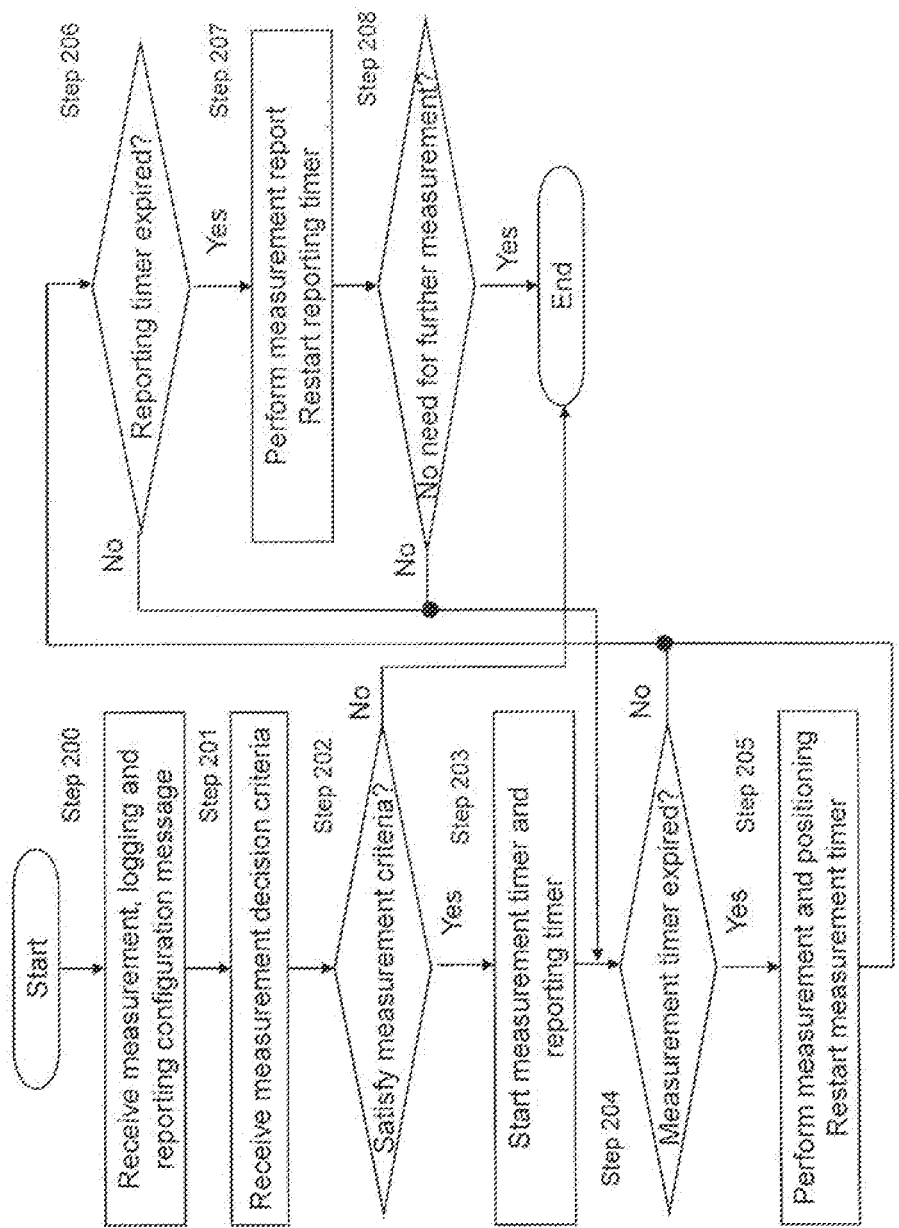
FIG. 12 is an operational flowchart of the radio terminal (UE) 30.

FIG. 12 is an operational flowchart of the radio terminal (UE) 30.

At first, the radio terminal (UE) 30 receives the collection/reporting control information related to the measurement method and the reporting method (Measurement logging and reporting configuration) (Step 200). Further, the radio terminal (UE) 30 receives the determination criterion information (Measurement decision criteria configuration) (Step 201).

Continuously, the radio terminal (UE) 30 determines whether or not the execution determination information (the terminal situation etc.) satisfies the notified determination criterion (Satisfy measurement criteria?) (Step 202).

The radio terminal (UE) 30 starts a measurement timer and a reporting timer (Start measurement timer and reporting timer) when the terminal situation satisfies the notified determination criterion (Measurement decision criteria) (Step 203).

The radio terminal (UE) 30 performs the measurement and the positioning (Perform measurement and localization) when the measurement timer has expired (Measurement timer expired?) (Step 204), and restarts the measurement timer (Restart measurement timer) (Step 205).

Continuously, the radio terminal (UE) 30 performs the reporting of the measurement log (Perform measurement report) when the reporting timer has expired (Reporting timer expired?) (Step 206), and restarts the reporting timer (Restart reporting timer) (Step 207).

When the process of the furthermore measurement is required, the operation proceeds to the Step 204, and when it is not required, the process is finished (Step 208).

Modified Example of the Third Exemplary Embodiment

The case of transmitting the item (index) which was the determination criterion and the reference value as the determination criterion information was explained in the above-described third exemplary embodiment. However, the determination criterion information is not limited hereto, and an ID No. showing the item of the terminal situation and the reference value to be used as the determination criterion may be notified as the determination criterion information. In this case, the radio terminal (UE) previously maintains a table in which the ID No. is associated with the item (category), the item (index) and the reference value. One example of this determination criterion information is shown in FIG. 13. Additionally, the item (category) may be deleted. In addition, the reference value may be deleted dependent on the item (index) (for example, the sort of the log as shown in FIG. 8 and the like).

With the determination criterion information shown in FIG. 13, the ID No., the item (category), the item (index), and the reference value are stored correspondingly to each other, and for example, the ID No. 1 and 2, the communication quality, the RSRP, and x1 dBm and y1 dBm each of which is the reference value thereof are associated each other, respectively. Further, the ID No. 3 and 4, the communication quality, the RSRQ, and x2 dBm and y2 dBm each of which is the reference value thereof are associated each other, respectively. Hereinafter, the situation is similar with the other ID No., which are associated with the remaining battery charge, the location of the terminal, and the moving speed, respectively.

As a method of the execution determination, in a case in which the communication channel quality is used, the measurement or the reporting may be performed when the communication channel quality is equal to or more than a reference value in some cases, or on the contrary, the measurement or the reporting may be performed when it is less than (or equal to or less than) a reference value in some cases. While as a preferable method, the method of performing the measurement when it is less than (or equal to or less than) a reference value and performing the reporting when it is equal to or more than a reference value is thinkable; however, the method of the execution determination is not limited hereto. The reason is that the measurement requires that the radio network side should grasp the environment in which the communication channel quality is worse, and the reporting should be executed without applying a load on the radio terminal if possible. Additionally, the number of the reference values is not limited to one, and the reference value may be configured so as to indicate a certain range. For example, x1-1 dBm or more and yet x1-2 dBm or less, and the like may be used.

Further, with the case of using the remaining battery charge, the measurement or the reporting is preferably performed when it is equal to or more than a reference value, and with the case of using the moving speed, the measurement or the reporting is preferably performed when it is less than (or, equal to or less than) a reference value; however the method of the execution determination is not limited hereto.

The radio base station (eNB) 31 transmits such an ID No. as the determination criterion information to the radio terminal (UE) 30 that stores the execution determination information. And, the radio terminal (UE) 30 compares the received ID No. with the pre-specified table that it stores, specifies the item (category), the item (index), and the reference value each of which is the determination criterion, and uses this as the determination criterion. The following operation is similar to that of the above-described first exemplary embodiment. Additionally, the number of the ID No. could be one in some cases, or could be plural in some cases.

Further, while a plurality of the reference values were provided for one item (category) and one item (index), respectively and the different ID No. was affixed to each reference value in the above-described modified example, one item (category), one item (index) and one reference value may be associated with one ID No. as shown in FIG. 14.

In addition, as shown in FIG. 15, a plurality of the items (categories), a plurality of the items (indexes) and a plurality of the reference values corresponding to them may be associated with one ID No.

Additionally, the table as described above may be notified by the radio base station (eNB) even though it is not specified as a specification.

Fourth Exemplary Embodiment

The fourth exemplary embodiment will be explained. The case of supposing a system of the 3GPP LTE (Long Term Evolution) will be explained in the fourth exemplary embodiment. Additionally, each of the radio terminal, the radio base station, and the NM assumes a similar constitution, so explanation will be performed with concentrating on different points.

The fourth exemplary embodiment, as shown in FIG. 16, uses a table in which one item or more and the reference value corresponding hereto are defined as a set, and a priority is affixed to each set. Additionally, it is assumed that each of the radio base station (eNB) 31 and the radio terminal (UE) 30 stores the above table.

The radio base station (eNB) 31, which differs from the radio base station (eNB) 31 of the third exemplary embodiment, transmits only the priority to the radio terminal (UE) 30. And, the radio terminal (UE) 30 performs the measurement and/or the reporting when the execution determination information (terminal situation etc.) that it stores satisfies the condition to be indicated by the received priority information.

For example, in FIG. 16, the priority 0 is associated with the communication quality and the remaining battery charge, and the moving speed, the priority 1 is associated with the communication quality and the remaining battery charge, . . . , the priority 4 is associated with the remaining battery charge, the priority 5 is associated with the communication quality and the moving speed, . . . , and the priority 7 is associated with the communication quality.

Herein, it is assumed that the radio base station (eNB) 31 has transmitted 1 as the priority. Then, the radio terminal (UE) 30 performs the measurement and/or the reporting when the communication quality is at least x2 dBm or more for the RSRP and is at least y2 dBm or more for the RSRQ, and the remaining battery charge is xx1 W or more (or the remaining memory capacity is y1 or more) with regard to the terminal situation of its own terminal. However, the execution determination method is not limited hereto, and for example, the radio terminal (UE) 30 may perform the measurement and/or the reporting when the communication quality is less than (or equal to or less than) x2 dBm for the RSRP and is less than (or equal to or less than) y2 dBm for the RSRQ, and the remaining battery charge is xx1 W or more. In addition, the method of using the reference value may be changed depending on the execution determination of the measurement and the execution determination of the reporting (equal to or more than, less than, and the like).

Additionally, the number of the reference values is not limited to one, and the reference value may be configured so as to indicate a certain range. For example, x1-1 dBm or more and yet less than x1-2 dBm (or x1-2 dBm or less), and the like may be used. Further, both of the remaining battery charge and the remaining memory capacity may be indicated in some cases, or one of them may be indicated in some cases.

Additionally, the table as described above may be notified by the radio base station (eNB) even though it is not specified as a specification.

Figure 17:
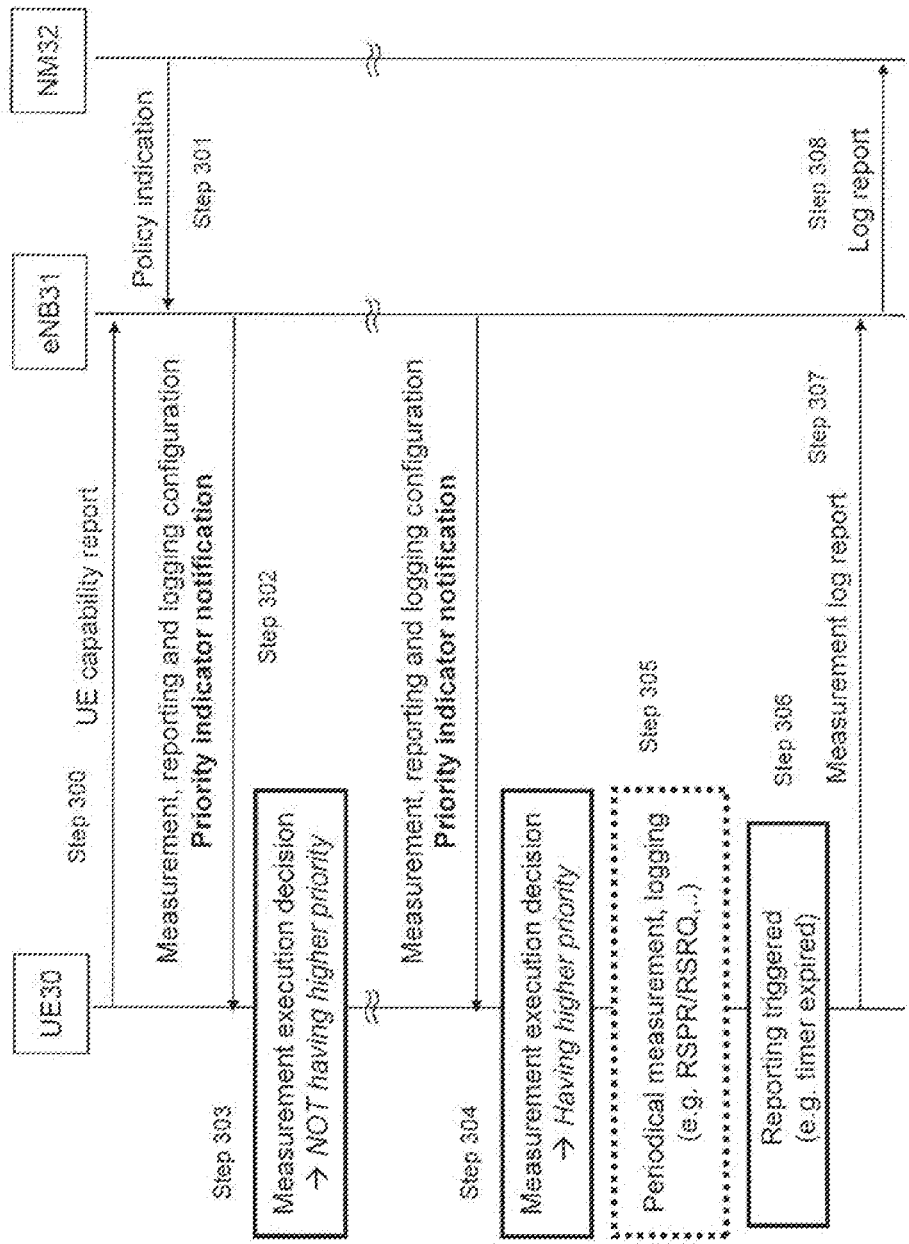
FIG. 17 is a sequence diagram for explaining an operation of a fourth exemplary embodiment.

FIG. 17 is a sequence diagram for explaining an operation of the fourth exemplary embodiment. Additionally, in the following explanation, it is assumed that the radio terminal (UE) 30 previously stores a table in which the priority is associated. Further, in this example, it is assumed that the measurement and the reporting by the radio terminal (UE) 30 are periodically performed based on the timer to be notified from the radio base station (eNB) 31.

At first, the radio terminal (UE) 30 performs the terminal capability report (UE capability report) (Step 300).

The NM 32 notifies the measurement policy (Measurement policy) to the radio base station (eNB) 31 (Step 301).

The radio base station (eNB) 31 sends the measurement method, the logging method of the measurement result, and the reporting method of the radio terminal (UE) 30 as well as the timer value of the measurement interval related hereto and the timer value of the report interval at which the measurement log is reported as the collection/reporting control information (Measurement reporting and logging configuration) based on the measurement policy (Measurement policy). Further, in this exemplary embodiment, the radio base station (eNB) 31 transmits to the radio terminal (UE) 30 the priority as well that is applied to the radio terminal (UE) 30. (Priority indicator notification) (Step 302).

The radio terminal (UE) 30 determines whether or not the execution determination information (terminal situation etc.) of its own terminal satisfies the determination criterion corresponding to the notified priority (Measurement execution decision (Step 303). The radio terminal (UE) 30 does not perform the process of the measurement and the reporting when the terminal situation of its own terminal does not satisfy the determination criterion corresponding to the notified priority. At this time, the radio terminal (UE) 30 may transmit the reject (Reject) message of the measurement/reporting similarly to the case of the above-described exemplary embodiments (not shown in the figure).

On the other hand, when the terminal situation of its own terminal satisfies the determination criterion corresponding to the notified priority (Step 304), the radio terminal (UE) 30 performs the measurement at the measurement interval based on the notified timer value and logs the measurement result according to the instructed measurement method and reporting method (Measurement logging) (Step 305).

The radio terminal (UE) 30 transmits the measurement log report (Measurement log report) to the radio base station (eNB) 31 (Step 307) when the timer of the report interval expires (Step 306). And, the radio base station (eNB) 31 transmits an entirety or one part of the received measurement logs to the NM 32 (Log report) (Step 308).

This makes it possible to cause the radio terminal to perform the measurement and the reporting without (excessively) increasing a load on the radio terminal.

Additionally, in FIG. 17, the timing at which the NM 32 notifies (Policy indication) the measurement policy (Measurement policy) to the radio base station (eNB) 31 is a timing after receiving the terminal capability report (UE capability report); however, the timing is not limited hereto, and other timings such as a timing prior to the reception of the terminal capability report (UE capability report) may be used. Further, the radio base station (eNB) 31 may previously maintain the measurement policy (Measurement policy) in some cases, and it is not indispensable that the NM 32 notifies (Policy indication) the measurement policy (Measurement policy) when the radio base station (eNB) 31 maintains the measurement policy.

In addition, the present invention was applied in the technique of periodically performing the measurement/the reporting in this example, and needless to say, the present invention may be applied in the technique of the event trigger.

Next, an operation of the radio terminal (UE) will be explained.

Figure 18:
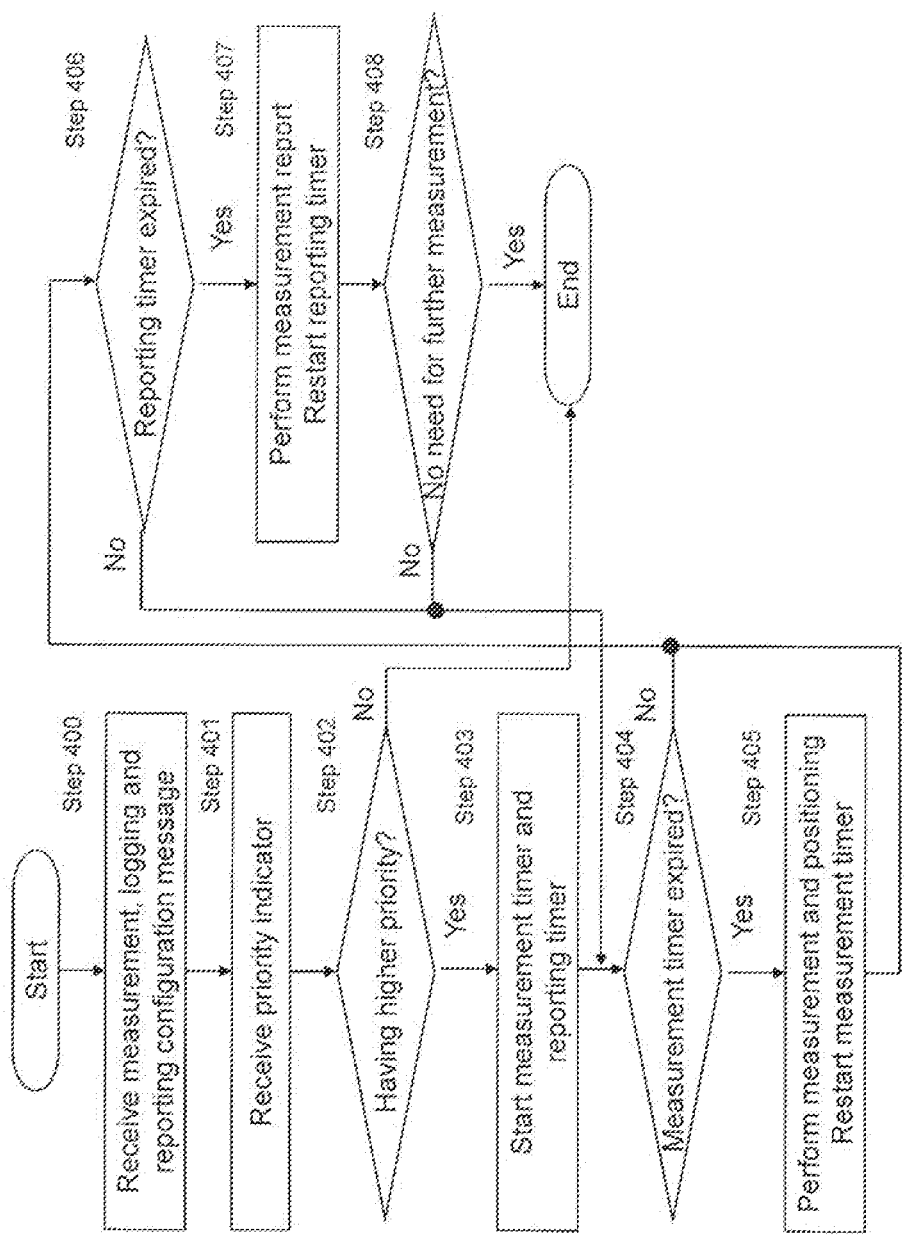
FIG. 18 is an operational flowchart of the radio terminal (UE) 30.

FIG. 18 is an operational flowchart of the radio terminal (UE) 30.

At first, the radio terminal (UE) 30 receives the configuration of the measurement method and reporting method (Measurement logging and reporting configuration) (Step 400). Further, the radio terminal (UE) 30 receives the priority as well (Priority indicator notification) (Step 401).

Continuously, the radio terminal (UE) 30 determines whether or not the execution determination information (the terminal situation etc.) is in a situation to be indicated by the notified priority, or in a higher situation (Having higher priority?) (Step 402).

The radio terminal (UE) 30 starts the measurement timer and the reporting timer (Start measurement timer and reporting timer) when the terminal situation is in a situation to be indicated by the notified priority, or in a higher situation (Step 403).

The radio terminal (UE) 30 performs the measurement and the positioning (Perform measurement and localization) when the measurement timer has expired (Measurement timer expired?) (Step 404), and restarts the measurement timer (Restart measurement timer) (Step 405).

Continuously, the radio terminal (UE) 30 performs the reporting of the measurement log (Perform measurement report) when the reporting timer has expired (Reporting timer expired?) (Step 406), and restarts the reporting timer (Restart reporting timer) (Step 407).

When the process of the furthermore measurement is required, the operation proceeds to the Step 404, and when it is not required, the process is finished (Step 408).

This makes it possible to cause the radio terminal to perform the measurement and the reporting without (excessively) increasing a load on the radio terminal.

Additionally, the number of the priorities to be notified could be plural.

Modified Example of the Fourth Exemplary Embodiment

The case in which the radio base station (eNB) 31 transmitted only the priority to the radio terminal (UE) 30 was explained in the above-described fourth exemplary embodiment. However, the transmission of the priority is not limited hereto.

For example, the radio terminal (UE) 30 previously maintains a table as shown in FIG. 19, and the priority is notified from the radio base station (eNB) 31. In this case, there exists the method of indicating the number of the determination criteria that should be satisfied as the priority. For example, when the priority 3 is notified, the radio terminal (UE) 30 performs the measurement and/or the reporting when the determination criteria of which the priority is 3 or higher (or 3 or lower), out of the determination criteria, are satisfied.

In addition, the radio terminal (UE) 30 regards the notified number (=3) as the priority as the number of the determination criteria that should be satisfied, and performs the measurement and/or the reporting when the three determination criteria (or more) are satisfied. Further, the method having the condition for specifying the number of the determination criteria that should be satisfied, which are selected in the descending order of the priority, is also used. For example, when the priority 4 is notified, the radio terminal (UE) 30 performs the measurement and/or the reporting when four determination criteria (or more), out of the determination criteria, which are selected in the descending order of the priority (for example, in the ascending order of the value), are satisfied.

This makes it possible to cause the radio terminal to perform the measurement and the reporting without (excessively) increasing a load on the radio terminal.

Fifth Exemplary Embodiment

The fifth exemplary embodiment will be explained.

The case of supposing a system of the 3GPP LTE (Long Term Evolution) will be explained in the fifth exemplary embodiment. Additionally, each of the radio terminal, the radio base station, and the NM assumes a similar constitution, so explanation will be performed with concentrating on different points.

In the fifth exemplary embodiment, the radio terminal (UE) 30 previously stores the determination criterion, and the determination criterion information is not transmitted from the radio base station (eNB) 31. And, the radio terminal (UE) 30 performs the measurement and/or the reporting when the execution determination information (for example, the terminal situation etc.) that it stores satisfies the determination criterion with regard to the terminal situation.

Figure 20:
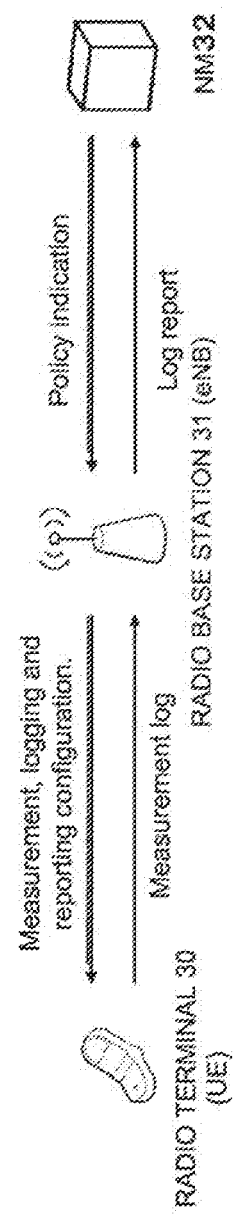
FIG. 20 is a constitution view of the radio communication system in a fifth exemplary embodiment.

FIG. 20 is a constitution view of the radio communication system in the fifth exemplary embodiment.

The NM (Network Manager) 32 notifies a policy of the measurement, the logging of the measurement result, and the reporting of the above logging by the terminal (Policy indication) to the radio base station (eNB) 31. As a target of this policy, for example, the minimization of the drive test (MDT: Minimization of Drive Test. Or it is also called a substitute for the drive test (Drive Test Substitution)) and the like are thinkable.

The radio base station (eNB) 31 notifies the measurement method, the logging method, and the reporting method (Measurement, logging and reporting configuration) to the radio terminal (UE) 30 based on the policy of the measurement, the logging of the measurement result, the reporting of the above log (Policy indication).

Figure 21:
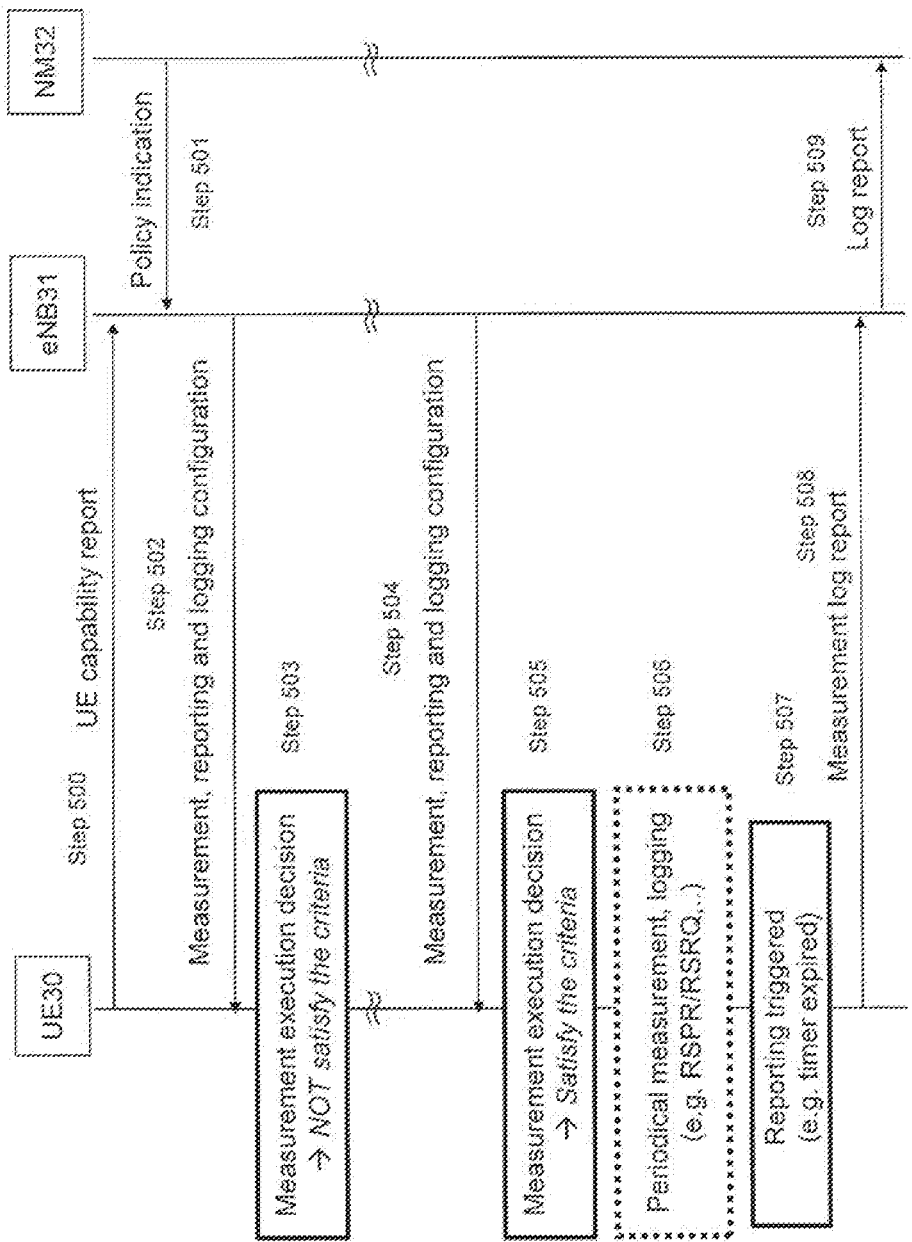
FIG. 21 is a sequence diagram for explaining a specific operation of the fifth exemplary embodiment.

FIG. 21 is a sequence diagram for explaining an operation of the fifth exemplary embodiment. Additionally, in the following explanation, it is assumed that the radio terminal (UE) 30 stores the determination criterion. Further, in this example, it is assumed that the measurement and the reporting by the radio terminal (UE) 30 are periodically performed based on the timer to be notified from the radio base station (eNB) 31.

At first, the radio terminal (UE) 30 performs the terminal capability report (UE capability report) (Step 500).

The NM 32 notifies the measurement policy (Measurement policy) to the radio base station (eNB) 31 (Step 501).

The radio base station (eNB) 31 transmits the measurement method, the logging method of the measurement result, and the reporting method of the radio terminal (UE) 30 as well as the timer value of the measurement interval related hereto and the timer value of the report interval at which the measurement log is reported as the collection/reporting control information (Measurement reporting and logging configuration) based on the measurement policy (Measurement policy) (Step 502).

The radio terminal (UE) 30 determines whether or not the execution determination information (terminal situation etc.) of its own terminal satisfies the determination criterion that it stores (Measurement execution decision (Step 503). The radio terminal (UE) 30 does not perform the process of measurement/the reporting when the terminal situation of its own terminal does not satisfy the determination criterion that its own terminal stores. At this time, the radio terminal (UE) 30 may transmit the reject (Reject) message of the measurement/the reporting similarly to the case of the above-described exemplary embodiments (not shown in the figure).

On the other hand, when the terminal situation of its own terminal satisfies the determination criterion that its own terminal stores (Step 504), the radio terminal (UE) 30 performs the measurement at the measurement interval based on the notified timer value and logs the measurement result according to the instructed measurement method and reporting method (Measurement logging) (Step 505).

The radio terminal (UE) 30 transmits the measurement log report (Measurement log report) to the radio base station (eNB) 31 (Step 507) when the timer of the report interval expires (Step 506). And, the radio base station (eNB) 31 transmits an entirety or one part of the received measurement logs to the NM 32 (log report) (Step 508).

This makes it possible to cause the radio terminal to perform the measurement and the reporting without (excessively) increasing a load on the radio terminal.

Additionally, in FIG. 21, the timing at which the NM 32 notifies (Policy indication) the measurement policy (Measurement policy) to the radio base station (eNB) 31 is a timing after receiving the terminal capability report (UE capability report); however, the timing is not limited hereto, and other timings such as a timing prior to the reception of the terminal capability report (UE capability report) may be used. Further, the radio base station (eNB) 31 may previously maintain the measurement policy (Measurement policy) in some cases, and it is not indispensable that the NM 32 notifies (Policy indication) the measurement policy (Measurement policy) when the radio base station (eNB) 31 maintains the measurement policy.

In addition, the present invention was applied in the technique of periodically performing the measurement/the reporting in this example, and needless to say, the present invention may be applied in the technique of the event trigger.

Next, an operation of the radio terminal (UE) will be explained.

Figure 22:
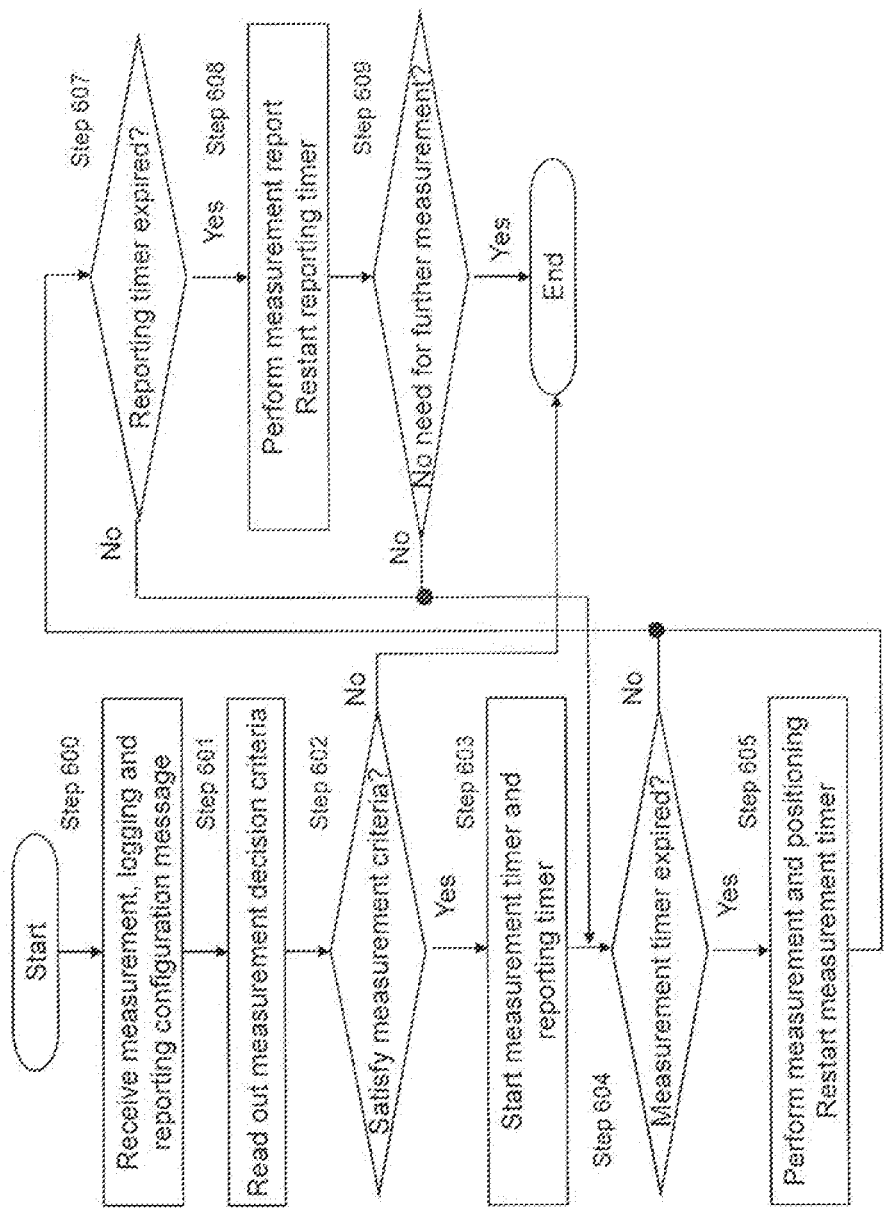
FIG. 22 is an operational flowchart of the radio terminal (UE) 30.

FIG. 22 is an operational flowchart of the radio terminal (UE) 30.

At first, the radio terminal (UE) 30 receives the configuration of the measurement method and the reporting method (Measurement logging and reporting configuration) (Step 600). Further, the radio terminal (UE) 30 reads out the determination criterion that it stores (Read out measurement decision criteria) (Step 601).

Continuously, the radio terminal (UE) 30 determines whether or not the execution determination information (terminal situation etc.) satisfies the determination criterion with regard to the terminal situation (Satisfy measurement criteria?) (Step 602).

The radio terminal (UE) 30 starts the measurement timer and the reporting timer (Start measurement timer and reporting timer) when the terminal situation satisfies the determination criterion (Measurement decision criteria) (Step 603).

The radio terminal (UE) 30 performs the measurement and the positioning (Perform measurement and localization) when the measurement timer has expired (Measurement timer expired?) (Step 604), and restarts the measurement timer (Restart measurement timer) (Step 605).

Continuously, the radio terminal (UE) 30 performs the reporting of the measurement log (Perform measurement report) when the reporting timer has expired (Reporting timer expired?) (Step 606), and restarts the reporting timer (Restart reporting timer) (Step 607).

When the process of the furthermore measurement is required, the operation proceeds to the Step 604, and when it is not required, the process is finished (Step 608).

Sixth Exemplary Embodiment

Figure 23:
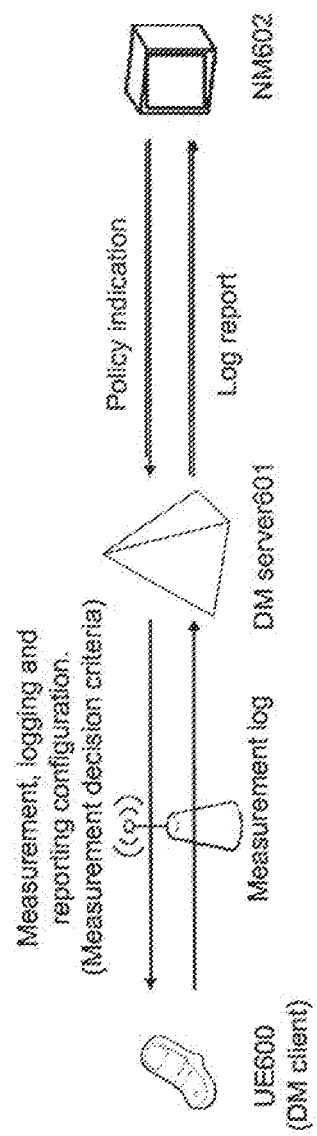
FIG. 23 is a constitution view of the radio communication system in a sixth exemplary embodiment.
Figure 24:
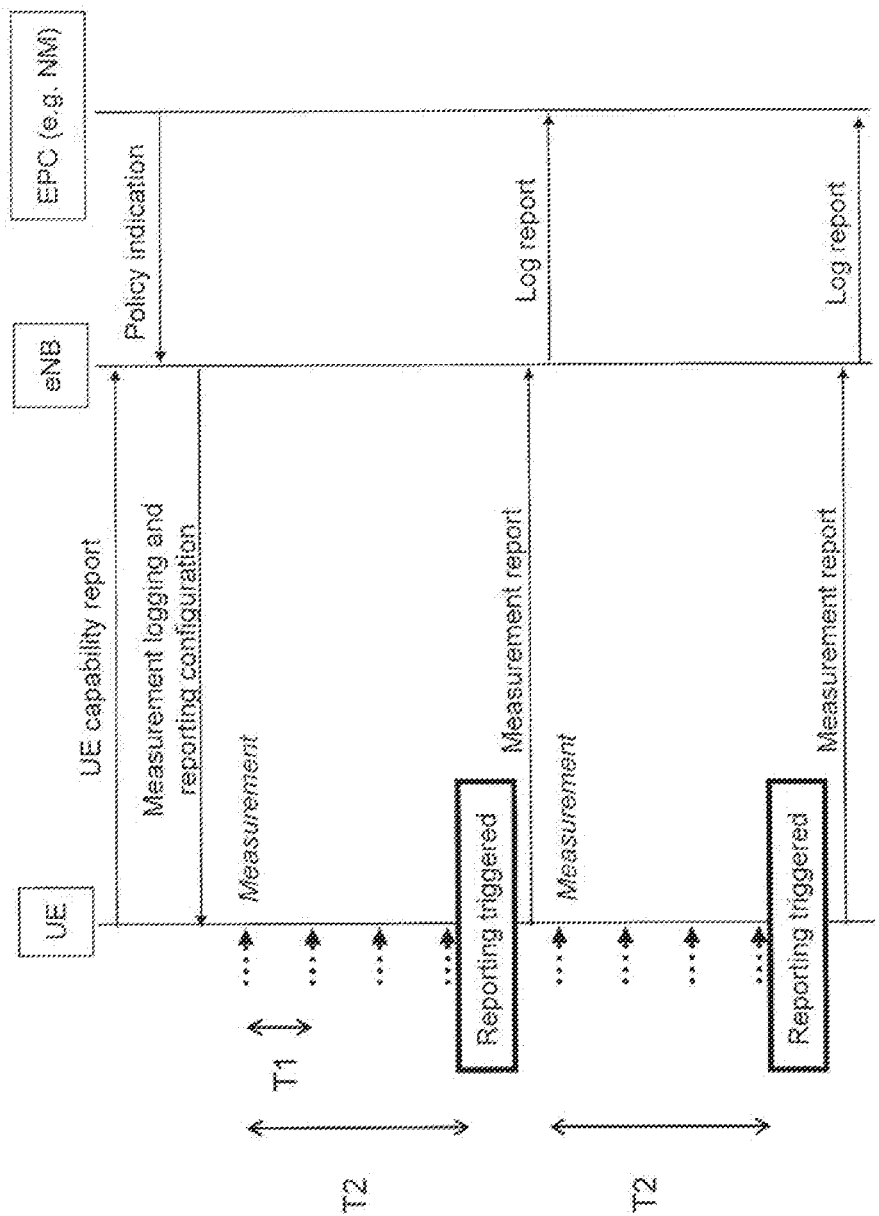
FIG. 24 is a view for explaining the technology related to the present invention.
Figure 25:
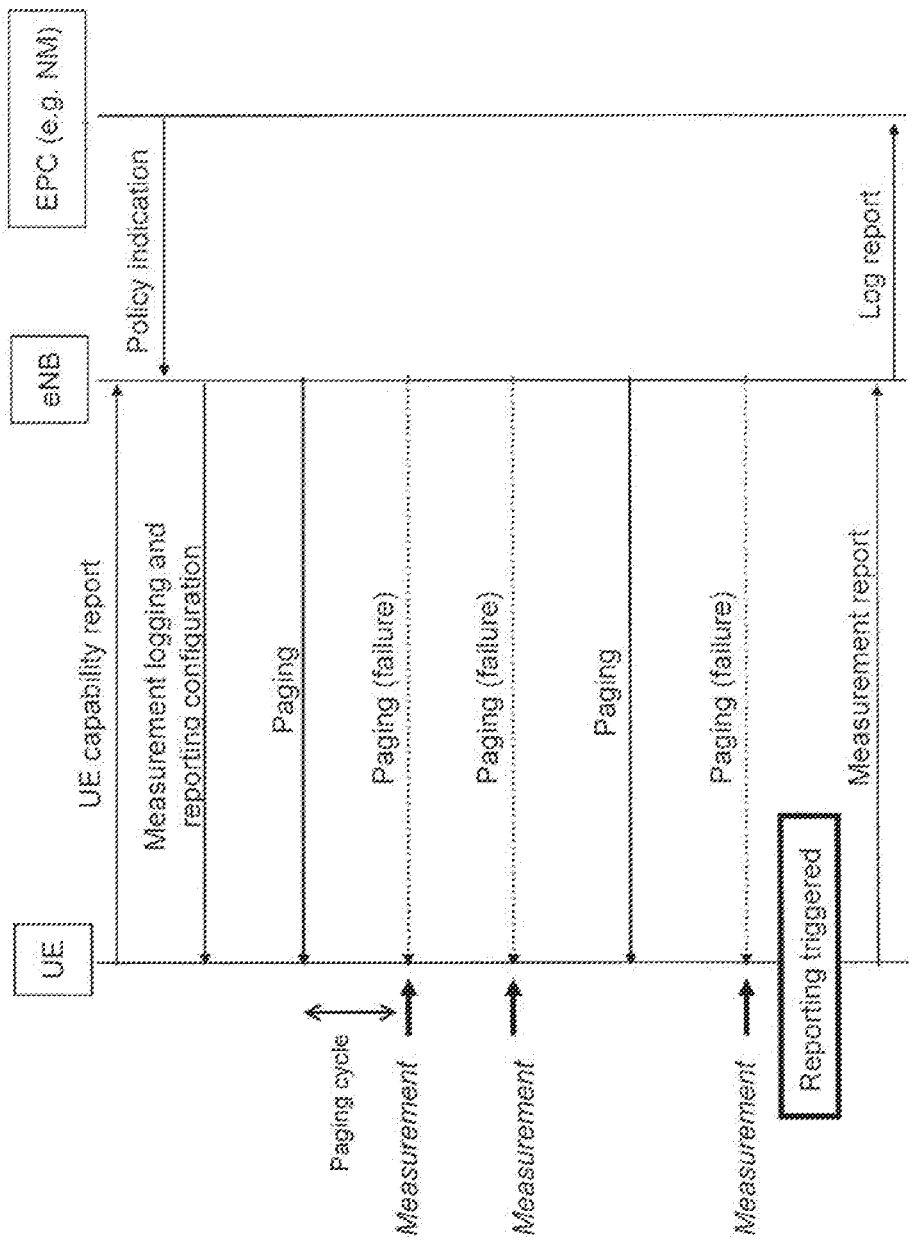
FIG. 25 is a view for explaining the technology related to the present invention.

FIG. 23 is a constitution view of the radio communication system in the sixth exemplary embodiment.

A UE (DM client) 600 corresponds to the radio terminal (UE) 30, a DM (Device Management) server 601 corresponds to the radio base station (eNB) 31, and an NM (Network Manager) 602 corresponds to the NM (Network Manager) 32. And, respective units operate similarly to the radio terminal (UE) 30, the radio base station (eNB) 31, and the NM (Network Manager) 32, respectively.

That is, the NM (Network Manager) 602 notifies a policy of the measurement, the logging of the measurement result, and the reporting of the above logging to the DM (Device Management) server 601 (Policy indication). The DM server 601 notifies the measurement/logging/reporting method to the UE 600, being a DM client (Measurement, logging and reporting configuration). The UE 600 reports the log of the measurement result (measurement log) to the DM server 601, and the DM server 601 reports the log reported from the UE 600 to the upper NM 602.

Additionally, in all the above-described exemplary embodiments, the policy of the measurement and the reporting was notified from the upper network node (NM) to the radio base station (eNB); however, the notification is not limited hereto. For example, the radio base station (eNB) itself may decide and configure the policy in some cases, or while taking the policy notified from the NM into consideration, the radio base station (eNB) may changes the above policy.

Further, while an example of the case in which the radio terminal actually performed the measurement and the reporting under (in a cell of) the radio base station having notified the configuration of the measurement method and the reporting method was shown in all the above-described exemplary embodiments, the application scope of the present invention is not limited hereto. For example, it is possible for the radio terminal to perform the operation as shown in the above-described examples so long as the above configuration is valid even after moving to cells of the other radio base stations from the cell of the radio base station having notified the configuration of the measurement method and the reporting method.

In addition, while the above-described exemplary embodiments basically supposed a system of the 3GPP LTE, the application scope of the present invention is not limited hereto. For example, the present invention is applicable to UMTS (Universal Mobile Telecommunication System) to be represented by WCDMA (Wideband Code Division Multiple Access), WiMAX (Worldwide interoperability for Microwave Access) and the like.

Further, while each unit was constituted with hardware in the above-described exemplary embodiments, it may be constituted with a program that causes an information processor (CPU) to execute the processes of the above-described operations.

Above, although the present invention has been particularly described with reference to the preferred embodiments and the examples, it should be readily apparent to those of ordinary skill in the art that the present invention is not always limited to the above-mentioned embodiment and examples, and changes and modifications in the form and details may be made without departing from the spirit and scope of the invention.

Further, the content of the above-mentioned exemplary embodiments can be expressed as follows.

(Supplementary note 1) A radio terminal having a function to collect and report measurement information to be indicated by a radio network, comprising:

means that receives collection/reporting control information related to execution of at least one of the collection of the measurement information and the reporting of said measurement information to the radio network by the radio terminal; and controlling means that executes at least one of said collection and said reporting based on said collection/reporting control information when execution determination information related to at least one of the collection and the reporting of said measurement information by its own terminal satisfies a predetermined determination criterion.

(Supplementary note 2) A radio terminal according to Supplementary note 1, wherein said execution determination information includes at least one of an index of at least one of information related to a situation of the radio terminal and information related to a collection situation of the measurement information, and an index value of the above index.

(Supplementary note 3) A radio terminal according to Supplementary note 1 or Supplementary note 2, comprising an execution determination information collecting means that collects the index values of said execution determination information.

(Supplementary note 4) A radio terminal according to one of Supplementary note 1 to Supplementary note 3, wherein said predetermined determination criterion is notified from said radio network.

(Supplementary note 5) A radio terminal according to Supplementary note 4, wherein said predetermined determination criterion is incorporated into configuration information together with said collection/reporting control information and is notified from said radio network.

(Supplementary note 6) A radio terminal according to one of Supplementary note 1 to Supplementary note 5:

wherein said predetermined determination criterion includes at least one index of said execution determination information, and at least one reference value for said index;

wherein said controlling means executes at least one of said collection and reporting based on said collection/reporting control information when the index value of the index of said execution determination information, which is corresponding to the index of said predetermined determination criterion, satisfies said reference value.

(Supplementary note 7) A radio terminal according to one of Supplementary note 1 to Supplementary note 6, including a table indicating at least one combination of the index of said execution determination information and the reference value for said index, or more said combinations:

wherein said predetermined determination criterion is identification information for identifying at least one said combination or more; and wherein said controlling means compares said identification information with said table, specifies the index of said execution determination information corresponding to said identification information, and the reference value for said index, and executes at least one of said collection and reporting based on said collection/reporting control information when the index value of the index of said execution determination information satisfies said specified reference value.

(Supplementary note 8) A radio terminal according to one of Supplementary note 1 to Supplementary note 7, including a table indicating at least one combination of the index of said execution determination information, the reference value for said index, and a priority, or more said combinations:

wherein said predetermined determination criterion is at least the priority; and wherein said controlling means compares the priority of said predetermine determination criterion with said table, specifies at least the index of said execution determination information corresponding to the priority of said predetermined determination criterion, and the reference value for said index, and executes at least one of said collection and reporting based on said collection/reporting control information when the index value of the index of said execution determination information satisfies said specified reference value.

(Supplementary note 9) A radio terminal according to Supplementary note 8, wherein said controlling means compares the priority of said predetermine determination criterion with said table, specifies at least the index of said execution determination information corresponding to the priority equal to or higher than that of said predetermined determination criterion, and the reference value for said index, and executes at least one of said collection and reporting based on said collection/reporting control information when the index value of the index of said execution determination information satisfies said specified reference value.

(Supplementary note 10) A radio terminal according to one of Supplementary note 1 to Supplementary note 9, including a table indicating at least one combination of the index of said execution determination information and the reference value for said index or more said combinations:

wherein said predetermined determination criterion is at least a value; and wherein said controlling means executes at least one of said collection and reporting based on said collection/reporting control information when the number of the indexes whose index value of said execution determination information satisfies said reference value satisfies at least the number which is the value of said predetermined determination criterion.

(Supplementary note 11) A radio terminal according to one of Supplementary note 1 to Supplementary note 10, wherein the index of said execution determination information is: at least one of a remaining battery charge of the radio terminal, location information of the radio terminal, received strength of a positioning radio wave (GPS radio wave) at the radio terminal, a communication quality of the radio terminal, and a moving speed of the radio terminal, or a combination thereof; or at least of one of a sort of the measurement information collected by the radio terminal, an amount of the measurement information collected by the radio terminal, a location in which the radio terminal has collected the measurement information, and a summary of the measurement information collected by the radio terminal, or a combination thereof.

(Supplementary note 12) A radio terminal according to one of Supplementary note 1 to Supplementary note 11, wherein said radio network includes at least one of a radio base station, a base station controller, a DM (Device Manager), and an NM (Network Manager).

(Supplementary note 13) A radio communication system for collecting and reporting, by a radio terminal, measurement information to be indicated by a radio network, comprising: notifying means that notifies collection/reporting control information related to execution of at least one of the collection of the measurement information and the reporting of said measurement information to the radio network by the radio terminal;

means that receives said collection/reporting control information; and controlling means that executes at least one of said collection and said reporting based on said collection/reporting control information when execution determination information related to at least one of the collection and the reporting of said measurement information by the radio terminal satisfies a predetermined determination criterion.

(Supplementary note 14) A radio communication system according to Supplementary note 13, wherein said execution determination information includes at least one of an index of at least one of information related to a situation of the radio terminal and information related to a collection situation of the measurement information, and an index value of the above index.

(Supplementary note 15) A radio communication system according to Supplementary note 13 or Supplementary note 14, comprising an execution determination information collecting means that collects the index values of said execution determination information.

(Supplementary note 16) A radio communication system according to one of Supplementary note 13 to Supplementary note 15, wherein said notifying means notifies said predetermined determination criterion.

(Supplementary note 17) A radio communication system according to one of Supplementary note 13 to Supplementary note 16, wherein said notifying means notifies configuration information including said predetermined determination criterion and said collection/reporting control information.

(Supplementary note 18) A radio communication system according to one of Supplementary note 13 to Supplementary note 17:

wherein said notifying means notifies the predetermined determination criterion including at least one index of said execution determination information and at least one reference value for said index; and wherein said controlling means executes at least one of said collection and reporting based on said collection/reporting control information when the index value of the index of said execution determination information, which is corresponding to the index of said notified predetermined determination criterion, satisfies said reference value.

(Supplementary note 19) A radio communication system according to one of Supplementary note 13 to Supplementary note 18, including a table indicating at least one combination of the index of said execution determination information and the reference value for said index, or more said combinations:

wherein said notifying means notifies the predetermined determination criterion including identification information for identifying at least one said combination or more; and wherein said controlling means compares said notified identification information with said table, specifies the index of said execution determination information corresponding to said identification information, and the reference value for said index, and executes at least one of said collection and reporting based on said collection/reporting control information when the index value of the index of said execution determination information satisfies said specified reference value.

(Supplementary note 20) A radio communication system according to one of Supplementary note 13 to Supplementary note 19, including a table indicating at least one combination of the index of said execution determination information, the reference value for said index, and a priority, or more said combinations:

wherein said notifying means notifies the predetermined determination criterion including at least the priority; and wherein said controlling means compares the priority of said notified predetermine determination criterion with said table, specifies at least the index of said execution determination information corresponding to the priority of said predetermined determination criterion, and the reference value for said index, and executes at least one of said collection and reporting based on said collection/reporting control information when the index value of the index of said execution determination information satisfies said specified reference value.

(Supplementary note 21) A radio communication system according to Supplementary note 20, wherein said controlling means compares the priority of said notified predetermined determination criterion with said table, specifies at least the index of said execution determination information corresponding to the priority equal to or higher than that of said predetermined determination criterion, and the reference value for said index, and executes at least one of said collection and reporting based on said collection/reporting control information when the index value of the index of said execution determination information satisfies said specified reference value.

(Supplementary note 22) A radio communication system according to one of Supplementary note 13 to Supplementary note 21, including a table indicating at least one combination of the index of said execution determination information and the reference value for said index or more said combinations:

wherein said notifying means notifies the predetermined determination criterion including at least a value; and wherein said controlling means executes at least one of said collection and reporting based on said collection/reporting control information when the number of the indexes whose index value of said execution determination information satisfies said reference value satisfies at least the number which is the value of said notified predetermined determination criterion.

(Supplementary note 23) A radio communication system according to one of Supplementary note 13 to Supplementary note 22, wherein the index of said execution determination information is:

at least one of a remaining battery charge of the radio terminal, location information of the radio terminal, received strength of a positioning radio wave (GPS radio wave) at the radio terminal, a communication quality of the radio terminal, and a moving speed of the radio terminal, or a combination thereof; or at least one of a sort of the measurement information collected by the radio terminal, an amount of the measurement information collected by the radio terminal, a location in which the radio terminal has collected the measurement information, and a summary of the measurement information collected by the radio terminal, or a combination thereof.

(Supplementary note 24) A radio communication system according to one of Supplementary note 13 to Supplementary note 23, wherein said radio network includes at least one of a radio base station, a base station controller, a DM (Device Manager), and an NM (Network Manager).

(Supplementary note 25) A radio network in a radio communication system for collecting and reporting, by a radio terminal, measurement information to be indicated by the radio network, comprising a notifying means that notifies a determination criterion for determining execution of at least one of said collection and reporting by said radio terminal based on execution determination information related to at least one of the collection and the reporting of said measurement information.

(Supplementary note 26) A radio communication method of collecting and reporting, by a radio terminal, measurement information to be indicated by a radio network, comprising:

receiving, by the radio terminal, collection/reporting control information related to execution of at least one of the collection of the measurement information and the reporting of said measurement information to the radio network; and executing, by the radio terminal, at least one of said collection and said reporting based on said collection/reporting control information when execution determination information related to at least one of the collection and the reporting of said measurement information by its own terminal satisfies a predetermined determination criterion.

(Supplementary note 27) A radio communication method of collecting and reporting, by a radio terminal, measurement information to be indicated by a radio network, comprising:

notifying collection/reporting control information related to execution of at least one of collection of the measurement information and reporting of said measurement information to the radio network by the radio terminal;

receiving said collection/reporting control information; and executing at least one of said collection and said reporting based on said collection/reporting control information when execution determination information related to at least one of the collection and the reporting of said measurement information by the radio terminal satisfies a predetermined determination criterion.

(Supplementary note 28) A program of a radio terminal having a function to collect and report measurement information to be indicated by a radio network, causing the radio terminal to execute the processes of:

receiving collection/reporting control information related to execution of at least one of the collection of the measurement information and the reporting of said measurement information to the radio network by the radio terminal; and executing at least one of said collection and said reporting based on said collection/reporting control information when execution determination information related to at least one of the collection and the reporting of said measurement information by its own terminal satisfies a predetermined determination criterion.

This application is based upon and claims the benefit of priority from Japanese patent application No. 2010-002365, filed on Jan. 7, 2010, the disclosure of which is incorporated herein in its entirety by reference.

REFERENCE SIGNS LIST 1 radio terminal (UE)
2 radio network
11 logging/reporting capability memory
12 measuring/measurement result logging function
13 measurement/reporting execution determining function
14 measurement reporting function
21 OAM policy & OAM requirement enforcement function
22 log storage function
radio terminal
31 radio base station
32 NM
600 radio terminal (UE)
601 DM server
602 NM

What is claimed:

1. A radio terminal comprising:
a receiver configured to receive, from a radio network, configuration information for measurement logging, the configuration information including a PLMN-ID (Public Land Mobile Network Identity); and
a processor configured to perform logging of measurement results when a first condition related to the PLMN-ID is satisfied, and
a transmitter configured to transmit, to the radio network, a report of the logged measurement results when the first condition related to the PLMN-ID is satisfied.

2. The radio terminal according to claim 1,
wherein the configuration information further includes area information, wherein the area information includes at least one of a Cell-ID and a location area to which the radio terminal belongs,
wherein the processor is further configured to perform logging of measurement results when both of the first condition related to the PLMN-ID and a second condition related to the area information are satisfied.

3. The radio terminal according to claim 2,
wherein the first condition is whether the a PLMN-ID of the radio terminal is same the PLMN-ID included in the configuration information, and
the second condition is whether the radio terminal camp on a cell belonging to an area indicated by the area information included in the configuration information.

4. The radio terminal according to claim 1,
wherein the processor is further configured to perform logging of measurement results based on a third condition related to usage of a memory implemented in the radio terminal for the logged measurement result.

5. A radio network comprising:
a transmitter configured to transmit, to a radio terminal, configuration information for measurement logging, the configuration information including a PLMN-ID (Public Land Mobile Network Identity); and
a receiver configured to receive, from the radio terminal, a report of logged measurement results which have been logged by the radio terminal,
wherein the configuration information causes the radio terminal to perform logging of measurement results when a first condition related to the PLMN-ID is satisfied, and to transmit, to the radio network, the report of logged measurement results when the first condition related to the PLMN-ID is satisfied.

6. The radio network according to claim 5,
wherein the configuration information further includes area information, wherein the area information includes at least one of a Cell-ID and a location area to which the radio terminal belongs,
wherein the logging of measurement results is performed by the radio terminal when both of the first condition related to the PLMN-ID and a second condition related to the area information are satisfied.

7. The radio network according to claim 6,
wherein the first condition is whether the a PLMN-ID of the radio terminal is same the PLMN-ID included in the configuration information, and
the second condition is whether the radio terminal camp on a cell belonging to an area indicated by the area information included in the configuration information.

8. The radio network according to claim 5,
wherein the logging of measurement results is performed by the radio terminal based on a third condition related to usage of a memory implemented in the radio terminal for the logged measurement result.

9. A method of a radio terminal comprising:
receiving, from a radio network, configuration information for measurement logging, the configuration information including a PLMN-ID (Public Land Mobile Network Identity);
logging measurement results when a first condition related to the PLMN-ID is satisfied; and
transmitting, to the radio network, a report of the logged measurement results when the first condition related to the PLMN-ID is satisfied.

10. A method of a radio network comprising:
- transmitting, to a radio terminal, configuration information for measurement logging, the configuration information including a PLMN-ID (Public Land Mobile Network Identity); and
- receiving, from the radio terminal, a report of the logged measurement results which have been logged by the radio terminal,
- wherein the configuration information causes the radio terminal to perform logging of measurement results when a first condition related to the PLMN-ID is satisfied, and to transmit, to the radio network, the report of the logged measurement results when the first condition related to the PLMN-ID is satisfied.

* * * * *